United States Patent
Porter

(10) Patent No.: US 10,619,659 B2
(45) Date of Patent: Apr. 14, 2020

(54) CLOSURE ASSEMBLY WITH COLLAPSIBLE CRUSH BARBS CONFIGURED WITHIN A RECESS CAVITY DEFINING EDGE OF A FIRST PIECE FOR ENGAGEMENT BY A PROJECTION OF A SECOND PIECE WHEN PRESS FIT WITHIN THE RECESS CAVITY IN ORDER TO ENGAGE THE PIECES TOGETHER

(71) Applicant: U.S. Farathane Corporation, Auburn Hills, MI (US)

(72) Inventor: Steve Porter, Romeo, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 39 days.

(21) Appl. No.: 16/038,712

(22) Filed: Jul. 18, 2018

(65) Prior Publication Data
US 2019/0040886 A1 Feb. 7, 2019

Related U.S. Application Data

(60) Provisional application No. 62/540,847, filed on Aug. 3, 2017.

(51) Int. Cl.
*F16B 5/00* (2006.01)
*F16B 2/22* (2006.01)
(Continued)

(52) U.S. Cl.
CPC ................ *F16B 2/22* (2013.01); *F16B 4/004* (2013.01); *F16B 5/126* (2013.01); *F16B 5/128* (2013.01)

(58) Field of Classification Search
CPC .... F16B 2/20; F16B 2/22; F16B 4/004; F16B 5/126; F16B 2/005; F16B 2/00;
(Continued)

(56) References Cited

U.S. PATENT DOCUMENTS

| 719,036 | A | * | 1/1903 | Pederson | ............ | F16B 13/0808 |
| | | | | | | 411/344 |
| 1,074,409 | A | * | 9/1913 | Crippen | .............. | F16B 13/0808 |
| | | | | | | 411/345 |

(Continued)

FOREIGN PATENT DOCUMENTS

| DE | 2525650 C3 | 5/1978 |
| WO | 2014128201 A1 | 8/2014 |
| WO | 2016075027 A1 | 5/2016 |

*Primary Examiner* — Jack W Lavinder
(74) *Attorney, Agent, or Firm* — Dinsmore & Shohl LLP

(57) ABSTRACT

A closure assembly incorporating a crush barb which is molded into a recess cavity defining surface of a first piece. The crush barb is engaged by an inserting portion projecting from a second piece, the inserting portion being subsequently actuated into a collapsing and retention forming undercut with the crush barb in order to secure the pieces together. A variety of closure assemblies are provided with variations of inserting portions associated with the second piece, such including the use of an action/installation inducing tool for creating an undercut within the crush barb. Alternatively, the inserting portion may be configured with an over-center pivoting hinge which, upon being actuated, creates the crush barb undercut in order to engage the pieces together.

13 Claims, 21 Drawing Sheets

(51) Int. Cl.
*F16B 4/00* (2006.01)
*F16B 5/12* (2006.01)

(58) Field of Classification Search
CPC .... F16B 2/205; F16B 2013/007; F16B 13/04; F16B 13/0808; F16B 13/0833; F16B 13/045; Y10T 403/76; Y10T 403/589; Y10T 24/45471; Y10T 24/45497; Y10T 24/45503; Y10T 24/45508; Y10T 24/45513; Y10T 24/45529; Y10T 24/49; Y10T 24/492; Y10T 24/493; Y10T 24/495; Y10T 24/50; Y10T 24/3683; Y10T 24/3685; Y10T 24/44026; Y10T 24/44017; Y10T 24/309; Y10T 24/303; Y10S 411/922
USPC .............. 24/703.1–703.6, DIG. 47, DIG. 51, 24/DIG. 52; 403/277, 279, 281, 282, 403/285, 326, 409.1; 411/340, 344, 345, 411/360, 969, 362
See application file for complete search history.

(56) References Cited

U.S. PATENT DOCUMENTS

| | | | |
|---|---|---|---|
| 2,596,940 A * | 5/1952 | Ougljesa | F16B 21/086 411/508 |
| 3,417,439 A | 12/1968 | Seckerson | |
| 3,431,813 A * | 3/1969 | Johnson | F16B 13/04 411/61 |
| 3,745,616 A | 7/1973 | Batts | |
| 4,179,791 A | 12/1979 | Speraw | |
| 5,152,034 A | 10/1992 | Konings et al. | |
| 5,193,322 A * | 3/1993 | Wood | E04F 13/081 52/287.1 |
| 5,672,036 A * | 9/1997 | Medal | B65D 23/104 411/171 |
| 5,672,038 A * | 9/1997 | Eaton | F16B 15/06 411/508 |
| 6,058,574 A | 5/2000 | Facey et al. | |
| 6,248,276 B1 | 6/2001 | Parellada et al. | |
| 6,427,500 B1 | 8/2002 | Weinerman et al. | |
| 7,497,718 B2 | 3/2009 | Nix et al. | |
| 7,900,325 B1 | 3/2011 | Mangone, Jr. | |
| 8,136,849 B2 | 3/2012 | Hakemann | |
| 8,375,529 B1 | 2/2013 | Duffy | |
| 8,534,624 B2 | 9/2013 | Lunitz et al. | |
| 8,713,764 B1 | 5/2014 | Rittenhouse et al. | |
| 9,242,769 B2 | 1/2016 | Gartz et al. | |
| 9,469,449 B1 | 10/2016 | Fields | |
| 9,899,822 B2 * | 2/2018 | Richardson | B60R 16/0222 |
| 2003/0101682 A1 | 6/2003 | Crye et al. | |
| 2005/0081346 A1 | 4/2005 | Clarner | |
| 2005/0258180 A1 | 11/2005 | Lown | |
| 2011/0191984 A1 | 8/2011 | Tiemann et al. | |
| 2013/0043260 A1 | 2/2013 | Barron | |
| 2013/0313257 A1 | 11/2013 | Gartz et al. | |
| 2014/0165343 A1 * | 6/2014 | Gibbs | F16B 2/22 24/542 |
| 2014/0356051 A1 | 12/2014 | Korb | |
| 2015/0211556 A1 * | 7/2015 | Alexander | F16B 2/22 114/361 |
| 2017/0188676 A1 | 7/2017 | Denike et al. | |
| 2017/0350139 A1 | 12/2017 | De Rick et al. | |
| 2018/0106088 A1 | 4/2018 | Zetti | |
| 2018/0128299 A1 * | 5/2018 | Katabira | F16B 37/0857 |

* cited by examiner

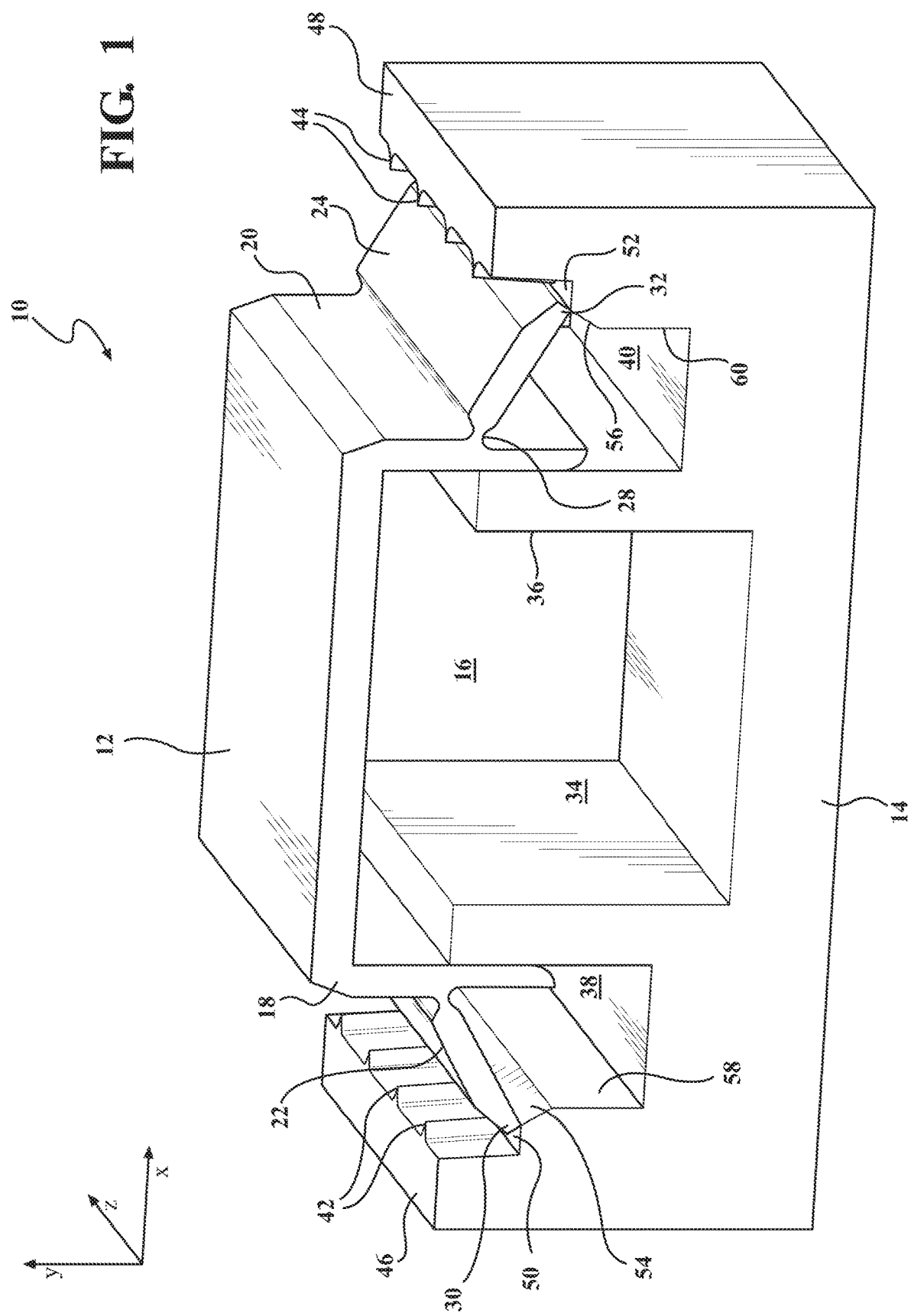

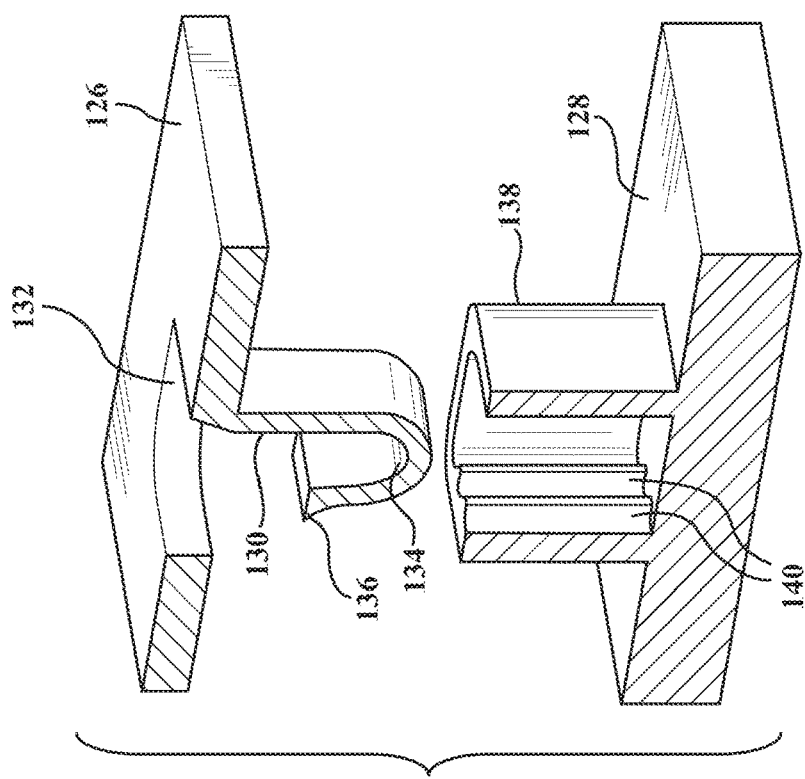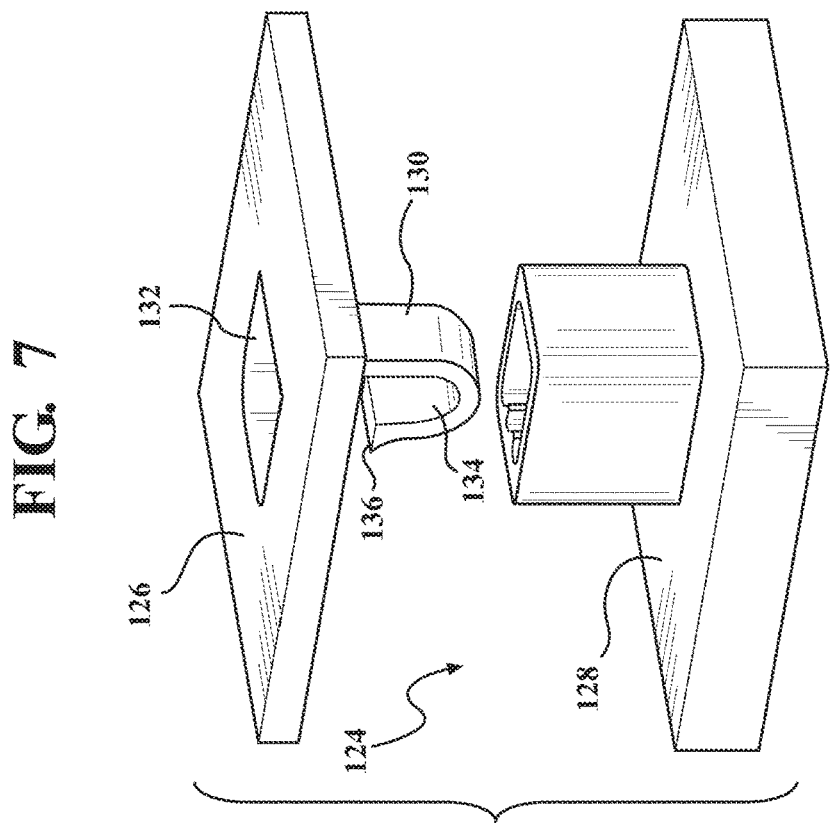

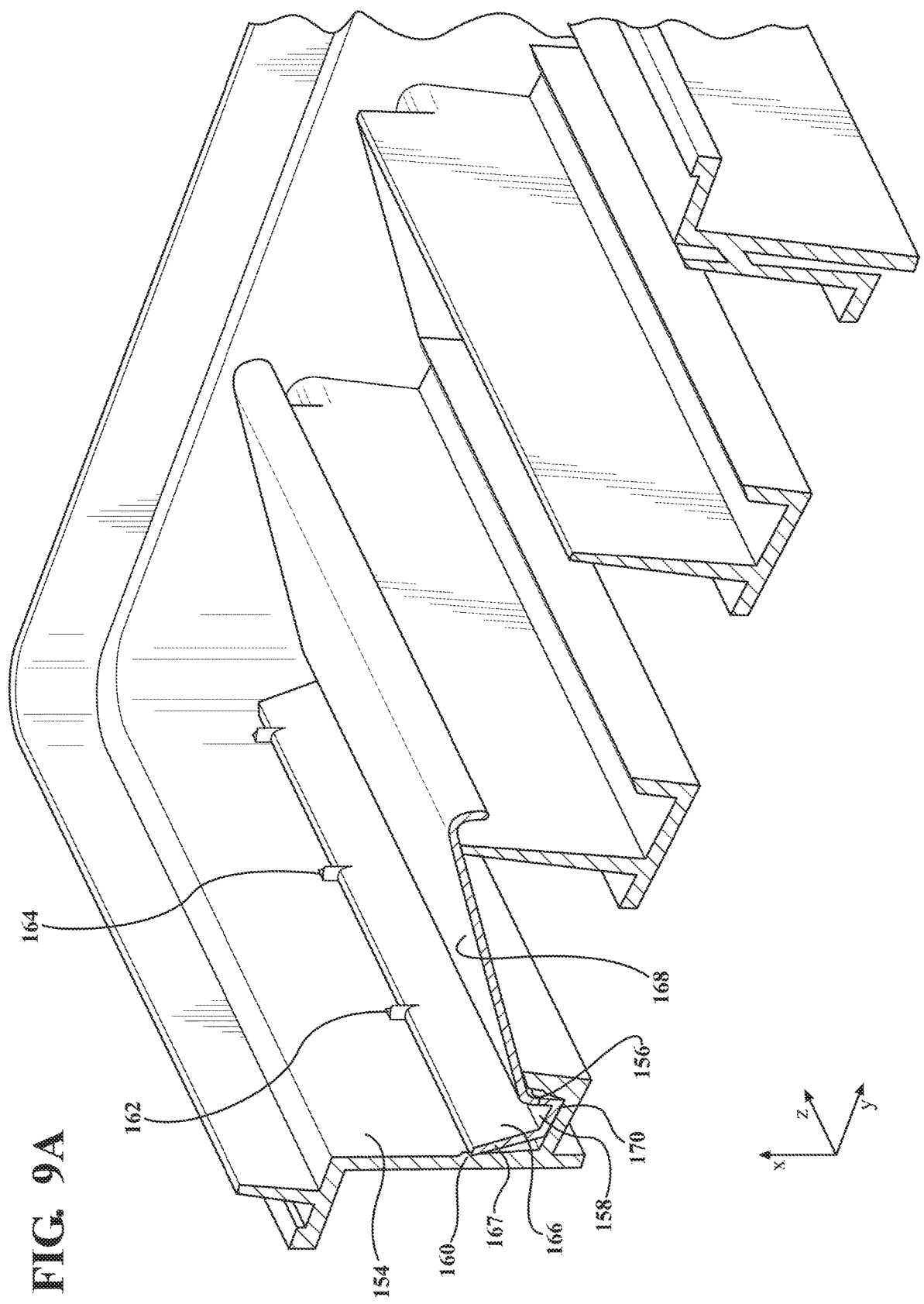

CLOSURE ASSEMBLY WITH COLLAPSIBLE CRUSH BARBS CONFIGURED WITHIN A RECESS CAVITY DEFINING EDGE OF A FIRST PIECE FOR ENGAGEMENT BY A PROJECTION OF A SECOND PIECE WHEN PRESS FIT WITHIN THE RECESS CAVITY IN ORDER TO ENGAGE THE PIECES TOGETHER

The present application claims priority from U.S. Ser. No. 62/540,847 filed Aug. 3, 2017, the contents of which are hereby incorporated by reference.

FIELD OF THE INVENTION

The present invention discloses a molded crush barb which, when configured within a recess defining edge of a first piece, is engaged by an inserting portion projecting from a second piece, such as in an undercut creating fashion in order to secure the pieces together. The present invention further discloses a variety of closure assemblies with variations of inserting portions associated with the second piece, such including the use of an action/installation inducing tool for creating an undercut within the crush barb. Alternatively, the inserting and engaging portion is configured with an over-center pivoting hinge which, upon locating the within the cavity recess, is actuated in pivoting fashion against the crush barb to create the desired undercut to engage the pieces together.

BACKGROUND OF THE RELEVANT ART

The prior art is documented with numerous examples of closure assemblies for directly engaging together individual pieces, panels or layers without the requirement for separate fasteners, adhesives or the like.

One example is the connector structure of Rittenhouse, U.S. Pat. No. 8,713,764, which is removably attached an object to a support platform and includes an elongated, rigid material base having a locking assembly disposed thereon and including a retainer and a gripping member. The gripping member is movably connected to the retainer and disposable relative to the base into both a locking orientation and a release orientation, wherein the locking orientation comprises a predetermined portion of the gripping member disposed in gripping, at least partially penetrating relation to an exposed surface of a corresponding part of either the support platform or the supported object. An activating member is connected to the gripping member and movable therewith, wherein positioning force exerted on the activating member will selectively dispose the gripping member between the locking and release orientations.

U.S. 2017/0350139, to De Rick et al, teaches a set of mutually lockable panels with a first panel having an edge including a male part and a second panel having an edge including a female part for receiving the male part of the first panel in unlocked condition of the panels. The male part has an outer side which, in locked condition of the panels, is directed to the second panel in a direction substantially parallel to the front face of the first panel, and an opposite inner side which is provided with a locking surface. The female part comprises a locking member, which is pivotable about a pivot axis that extends substantially parallel to the edge of the second panel and an actuator for rotating the locking member from its unlocked condition to a locked condition of the panels.

A further example from the known art includes the protective case with over-center flap closure and stylus holder of Denike et al. U.S. 2017/0188676 disclosing a sleeve portion (4) having a sleeve opening (17), a closure portion (6), and a hinge (8) connecting the closure portion (6) to the sleeve portion (4) adjacent the sleeve opening (17). A stylus cavity is formed within the sleeve portion. The opening of the stylus cavity is adjacent the sleeve opening. The hinge (8) is adapted to allow the closure portion (6) to move from a first position away from the sleeve opening and stylus cavity opening to allow the device (22) to be inserted into the sleeve portion (4) and the stylus to be inserted into the stylus cavity and a second position where the closure portion (6) is positionable over an end of the device (22) and over the stylus cavity opening.

SUMMARY OF THE INVENTION

The present invention is directed to a press fit closure assembly incorporating a crush barb which is molded into a recess cavity defining surface of a first piece or layer. The crush barb is engaged by an inserting and subsequently engaging portion associated with a second piece or layer, and which is actuated in some fashion to create the desired undercut in the crush barb where one did not previously exist in order to secure the two pieces together.

The present invention further discloses a variety of closure assemblies with variations of engaging portions associated with the second piece, such including the use of an action/installation inducing tool for creating an undercut within the crush barb. Alternatively, the engaging portion is configured with an over-center pivoting hinge which, upon being actuated, creates the crush barb undercut in order to engage the pieces together.

Variants of the invention are configured for use with any type of fastener application established between opposing pieces and not limited to any one type of joined profile between large pieces (such as defining an internal cavity duct) or the engagement of multiple fastener pieces within receiving profiles defined in an opposing base surface. In this manner, the collapsible crush barb and associated second piece/layer engagement portions can be adapted for use with any variety of two piece clips, trays or other assembleable closures. The closure assemblies depicted herein further exhibit opposing inserting and receiving profiles according to a variety of different configurations.

In a first selected and non-limiting configuration, the inserting portion of the second piece or layer exhibits a profile including a fixed flange and a pivoting hinged portion. The receiving and recess cavity defining profile of the first piece or layer includes a first depth extending surface seating the fixed flange, with a width extending cavity in the receiving profile further exhibiting any irregular profile for receiving and facilitating biased rotation of the hinged portion, such as in specific instances in order to achieve an over center reverse angled rotation relative to a crosswise horizontal axis extending across the receiving cavity. In this manner, the opposing profiles are inter-engaged in such a manner as to require substantial withdrawal force to separate.

In another configuration, the engagement profile integrates an "L" shaped leg portion which forms a portion of an inserting profile configured within an outer perimeter wall. Vertical crush ramps are configured along an inner surface of a first vertical wall of an inner perimeter profile which is seated within the outer perimeter profile supporting the "L" shaped leg portion. An opposite inner surface of the inner perimeter defining wall further configures a ramp which, upon contacting the angled outer edge of the "L" shaped leg, causes the opposite extending tip or leading edge of the lower/horizontal leg portion to deflect (kick out) in a manner that it causes controlled collapse of the crush barbs.

In a third configuration, the "L" shaped leg portion is reconfigured as a "J" hook projecting the upper mounting material, such exhibiting an engagement tip. Upon inserting within a perimeter defined receiving cavity of the second lower mounting material, the tip of the "J" hook biases against an arrangement of crush ramps configured upon an opposing inner surface of the receiving perimeter cavity. An access aperture in the first/upper mounting material permits the insertion of a tool bit end of an anvil style implement which forcibly deflects outwardly the tip into a controlled collapse engagement with the inwardly surface configured crush barbs. Upon removal of the tool, the pieces remain secured to one another without pivoting or over center motion of the "J" hook and absent the exertion of a sufficient disengagement force to shear off the crush barbs.

Additional configurations included integrating crush rib profiles into an receiving trough associated with a rigid ventilation tray. A coextruded soft flap includes a more rigid durometer base portion which can include some version of a J hook profile or hinged tail which, upon pressing downward with an appropriately configured installation tool, results in undercut collapse of the crush ribs or barbs to engage the flap to the tray in order to seal an associated window defined in the tray.

A further variant of two piece closure includes an opposite face of a first show surface layer exhibiting a post with molded crush barbs, with a second engaging layer further including either of radial and/or circumferential hinged areas designed into an over-center ring receiving portion with a central receiving aperture for deflecting the receiving portion of the second layer into an undercut and reverse hinged engagement with the first layer. Engagement of the two piece closure assembly occurs upon the over center ring being installed over the first layer post up to an intermediate ring stop location of the post, with further downward depressing of the second layer resulting in an over-center displacement of the over-center ring portion, simultaneous with crushing of the opposing base locations of the barbs in a diameter reducing fashion, further such that (upon full installation) a significantly greater withdrawal force must be applied in order to flip the over center ring back over center in order to separate the panels.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is perspective view of one non-limiting arrangement of a press fit closure assembly according to the present invention, such again including each of opposing inserting and receiving profiles, with the inserting profile including a fixed flange and a pivoting hinged portion and the receiving profile including a first depth extending surface seating the fixed flange, with a width extending cavity in the receiving profile further exhibiting any irregular profile for receiving and facilitating biased rotation of the hinged portion, such as in specific instances in order to achieve an over center reverse angled rotation relative to a crosswise horizontal axis extending across the receiving cavity and to force exertion of a significant withdrawal force in order to subsequently separate the pieces;

FIGS. 4 and 4A are a pair of overall and enlarged perspectives of a further application of the press fit closure assembly including an inserting profile configured within a base of an extruded seal, with a receiving profile incorporated into a molded panel;

FIG. 7 is an illustration of a non over-center engagement configuration according to a further variant in which a projecting J hook configuration of a first mounting material is received within a recess cavity of a second material;

FIG. 7A is a succeeding cutaway view of FIG. 7 illustrating an arrangement of vertical crush barbs associated with the recess cavity;

FIG. 8F is an enlarged partial view of the undercut formation in the in-molded crush barb, such as by the engaging tip of the J-hook portion in FIG. 8D;

FIG. 9A is an enlarged perspective cutaway of the tray of FIG. 9 in combination with a coextruded flap engaged to a receiving trough location associated with a selected aperture;

DETAILED DESCRIPTION OF THE PREFERRED EMBODIMENTS

Figure 2A:
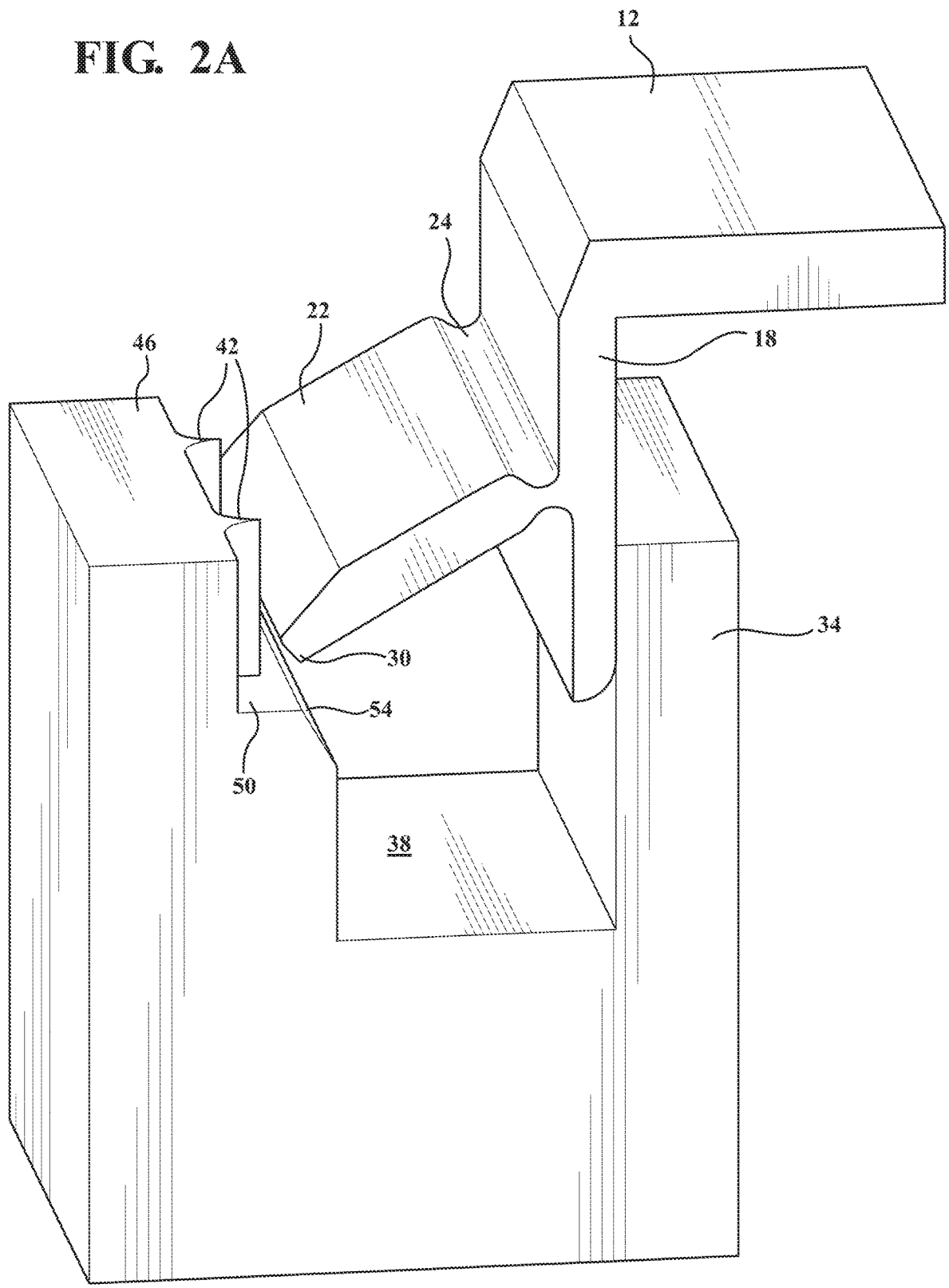
FIG. 2A is a rotated partial illustration of the press fit closure arrangement of FIG. 1 and which illustrates from another angle the arrangement of vertically collapsible ribs configured in an outer opposing and cavity defining edge of the receiving profile, such including an intermediate stepped horizontal ledge for receiving a leading edge of the hinged portion for subsequent over center rotation concurrent with collapsing of proximate locations of the ribs in order establish the over-center gripping condition.

With reference to the attached figures, the present invention discloses a closure configuration including any plurality of crush barbs, such as which are integrated into a recess or cavity defining surface of a first piece or layer, an inserting and engaging portion of a second piece or layer contacting the barbs and, upon being actuated, causing a controlled and undercut forming collapse of the barbs to secure the pieces together. A variety of assemble-able articles produced according to the present inventions include any type of two piece elongated and molded ductwork (in the examples of FIGS. 1-3). Additional variants include incorporating into any of an extruded seal attached to a molded panel or other application, such as integrating the profiles into first and second engagement halves of a rivet-type fastener, and in which a secure engagement profile is desired between the first and second pieces.

Each of the several designs disclosed herein operate under the principle of a recess profile of a base mounting or receiving piece which includes, such as along a selected vertically arrayed surface defining a cavity, the plurality of collapsible crush barbs or portions. In the broadest application of the invention, the crush barb (according to any variant) is engaged by the tip of an inserting and subsequently engaging portion associated with a second piece or layer, and which is actuated in some fashion (including such as either of a hinged over center action or that assisted by application of a separate die or tool) to create the desired undercut in the crush barb where one did not previously exist in order to secure the two pieces together.

According to given variants (initially such as those shown in FIGS. 1-4A), the engagement portions of an opposing and inserting profile of a second piece can include an inner sliding flange or contact surface, from which is pivotally and hingedly secured a leg or wing portion. Upon initially inserting the second piece into contact with the receiving profile of the first or base piece/structure, continued downward force results in the hinged wing or leg pivoting upward, such as to an over-center compressed position, this concurrent with its leading edge digging into and collapsing base locations of the collapsible portions (or barbs), such as further which can be incorporated into a ledge or step location of the cavity defining receiving profile of the base receiving piece.

As will be further described in reference to the succeeding embodiments, the pivoting motion of the hinge or leg (whether in an over-center motion or a more limited range of pivot) operates in conjunction with the collapsible barbs or other shapes to create an undercut to maintain the wing from travelling up and out of the channel, such as when it goes over center concurrent with full engagement of the pieces. Similarly, the deflection or actuation of the inserting portion of a number of separate embodiments can also utilize the application of a punch or other tool for forming a suitable undercut into the crush barb and in order to secure the two pieces together.

The above stated, and referring initially to FIG. 1, a perspective view is generally depicted at 10 of one non-limiting arrangement of a press fit closure assembly according to the present invention and which is again utilized into a two piece or two layer configuration in the form of an assemble-able ductwork or other inner channel defining track or passageway. As will be further described, the variants of the present invention can vary from first and second structural pieces, shown initially in one non-limiting example at 12 and 14 in FIG. 1, which define such as an airflow ductwork, to other applications including each of an extruded seal attached to a molded panel or the like (FIGS. 4-4A) and two piece rivet-style fasteners (FIGS. 5-6) for engagement to sandwich therebetween any type of covering, membrane or structure. While note limited to any specific material construction, it is further envisioned in one non-limiting embodiment that the pieces 12/14 (as well as those associated with the other disclosed embodiments) can include any type of injection molded polymer, however the relative material content and construction of these can be varied, including one piece being of a slightly different material construction than the other, in order to maximize its engaging properties.

Figure 2B:
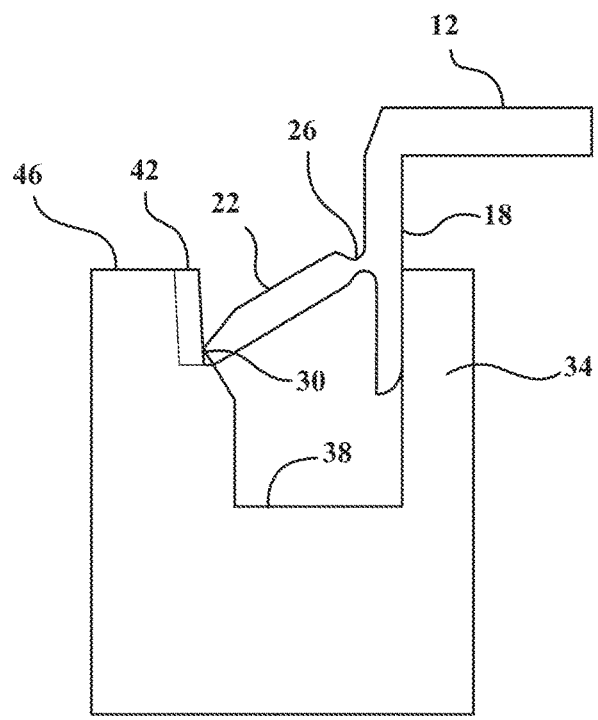
FIG. 2B is an initial inserting view succeeding FIG. 2A and illustrating the tip of the over center rotating hinged/wing portion becoming trapped in engaged position between the base of the vertically extending and spaced ribs and the intermediate extending ledge, such preventing the hinged wing from travelling any further into the recessed channel.
Figure 2C:
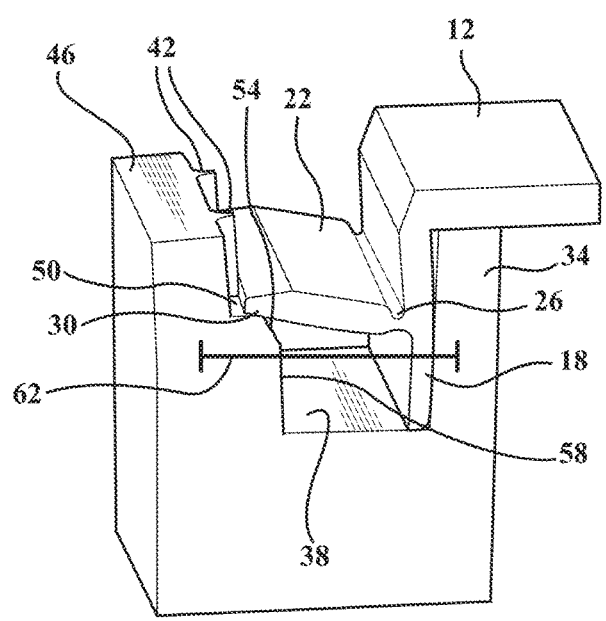
FIG. 2C and enlarged partial FIG. 2D further illustrate a fully engaged and over-center position established between the opposing profiles, such exhibited by the down standing flange traveling into a fully received and seated sliding abutment with an inner base edge of the receiving profile, in combination with the tip of the hinged wing being forced into a controlled collapsing of the barbs, such further creating an undercut arrangement for maintaining the hinged wing and preventing the same from travelling up and out of the channel once it passes the over center position relative to a horizontal axis passing through the hinge point and between the inner walls of the receiving profile, the inserting profile with flange and hinge being maintained in place absent a sufficient reverse upward force being exerted to cause the wing to travel in a downward reverse over center arrangement to permit separation thereof from the receiving profile.
Figure 2D:
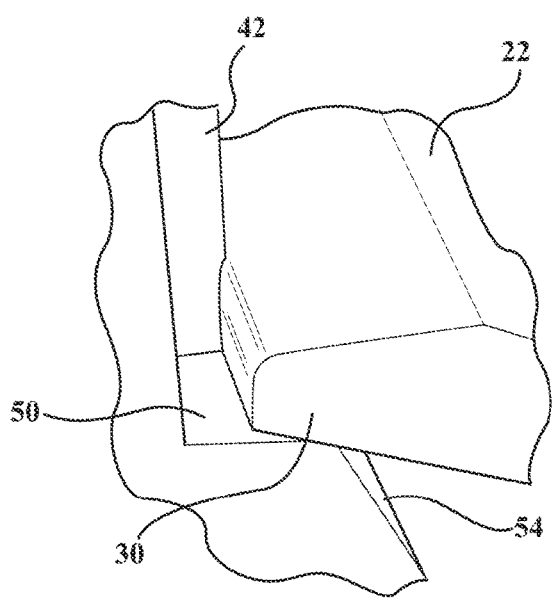

FIG. 1, along with the related partial views FIGS. 2-2D, defines a two piece inter-engaging structure establishing an interior channel 16 which can be associated with any airflow, fluid flow or conduit supporting application. The first or upper piece 12 includes a top surface and a pair of angled sides or flanges 18 and 20. A pair of wings 22 and 24 are provided which are hinged (such as by plastic living hinges) at narrowed locations 26 and 28 to intermediate external locations of the crosswise extending flanges 18/20, the wings 22/24 illustrated as including thickened intermediate cross sectional profiles and which respectively terminate in tapered end profiles 30/32.

The second or receiving profile piece 14 is depicted as a base mounting piece and which includes a pair of vertically extending support pillars 34 and 36 which exhibit smooth exterior surfaces for seating and slidably supporting opposing inside surfaces of the first piece 12 flanges 18/20. The pillars 34/36 establish inner (and outwardly facing) cavity defining surfaces, these opposed by outwardly spaced apart (and inwardly facing) receiving profiles along interconnected recess base surfaces 38 and 40.

The inwardly facing profiles, these being generally mirroring in arrangement as shown, each include pluralities of collapsible barbs (see at 42 and 44, respectively) which extend generally vertically from top edges 46/48 to intermediate stepped locations 50/52. Without limitation, the crush barbs 42/44 can be configured according to any generally triangular and arcuate/pointed profile configuration, and to further include other narrowed or tapered edge defining profiles which respond to engagement by the tapered ends or tips 30/32 of the wings 22/24 by collapsing in a given undercut forming location.

As further shown, the intermedial stepped locations 50/52 are communicated by succeeding angled (54 and 56) and vertical (58 and 60) surfaces which join outer edges of the base surfaces 38 and 40. The width extending cavities defined in the receiving profiles of the second piece 14 as shown further exhibit any irregular profile for receiving and facilitating biased rotation of the hinged or wing portions 22 and 24, such as in specific instances in order to achieve an over center reverse angled rotation relative to a crosswise horizontal axis extending across the receiving cavity at a location through the narrowed living hinge 26/68 of the wing portions, such requiring exertion of a significant withdrawal force in order to subsequently separate the pieces 12/14 following engagement.

Referring to FIG. 2A, a rotated partial illustration is shown of the press fit closure arrangement of FIG. 1 and which illustrates from another angle the arrangement of the vertically collapsible ribs 42/44 (one side of which is shown) configured in an outer opposing and cavity defining edge of the receiving profile, such again including an intermediate stepped horizontal ledge (at 50) for receiving the leading edge 30 of the hinged or wing portion 22 for subsequent over center rotation concurrent with collapsing of proximate locations of the ribs 42 (at the interface with the stepped location 50) this in order establish the over-center gripping condition.

FIG. 2B is an initial inserting view, succeeding FIG. 2A, and illustrating the selected tip 30 of the over center rotating hinged/wing portion 22 becoming trapped in engaged position between the base of the vertically extending and spaced collapsible barbs or ribs 42 and the intermediate extending or stepped ledge 50, such preventing the selected hinged wing 22 from travelling any further into the recessed channel.

FIG. 2C and enlarged partial FIG. 2D further illustrate a fully engaged and over-center position established between the opposing profiles, such exhibited by the down standing flange 18 traveling into a fully received and seated sliding abutment with an inner base edge of the base surface 38 of the receiving profile, this in combination with the tip 30 of the hinged wing 22 being forced into a controlled collapsing of the barbs 42. In this position, the over center rotated tip 30 creates an undercut arrangement (notably shown in FIG. 2D) for maintaining the hinged wing 22 and preventing the same from travelling up and out of the channel once it passes the over center position relative to a horizontal axis (at 62 in FIG. 2C) passing through the hinge point 26 and between the inner walls of the receiving profile. In this manner, the inserting profile with flange and hinge is biasingly maintained in place, absent a sufficient reverse upward force being exerted to cause the wing 22 to travel in a downward reverse over center arrangement (see again axis 62) in order to permit separation thereof from the receiving profile.

Figure 3:
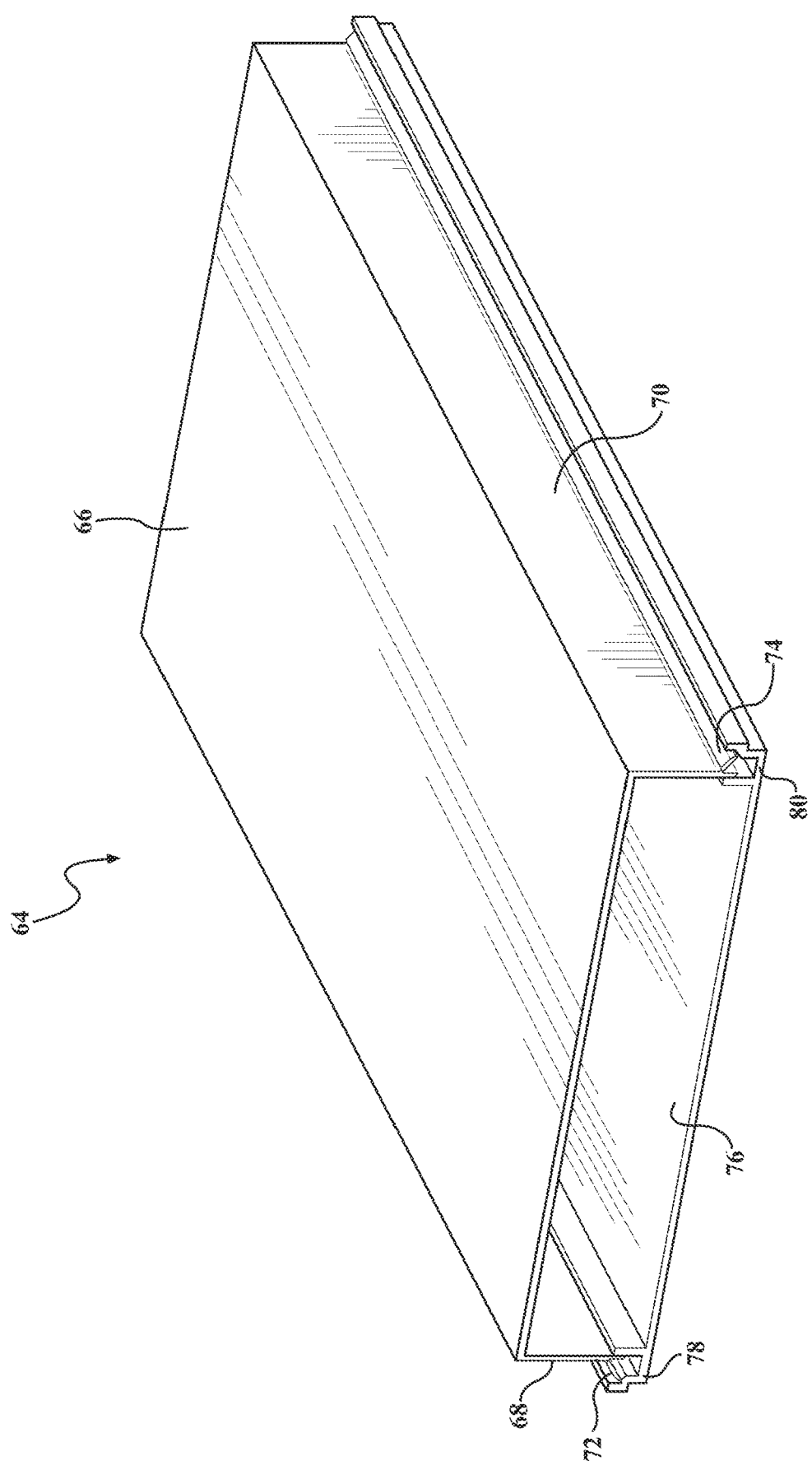
FIG. 3 is an illustration of a two piece molded air duct application utilizing the receiving profiles of the present invention.

Proceeding to FIG. 3, an illustration is generally shown at 64 of a two piece molded air duct application utilizing the receiving profiles of the present invention and as generally depicted in FIGS. 1-2D. As with the preceding embodiment, an upper piece 66 includes extending edges (or flanges) 68 and 70, these respectively concluding in inserting profiles, further at 72 and 74, which correspond generally to the afore-provided description. A lower opposing piece 76 likewise includes spaced apart edge profiles 78 and 80, each of which having a pair of spaced apart and upwardly projecting walls which define inner cavity profiles similar to that in FIG. 1.

Figure 4:
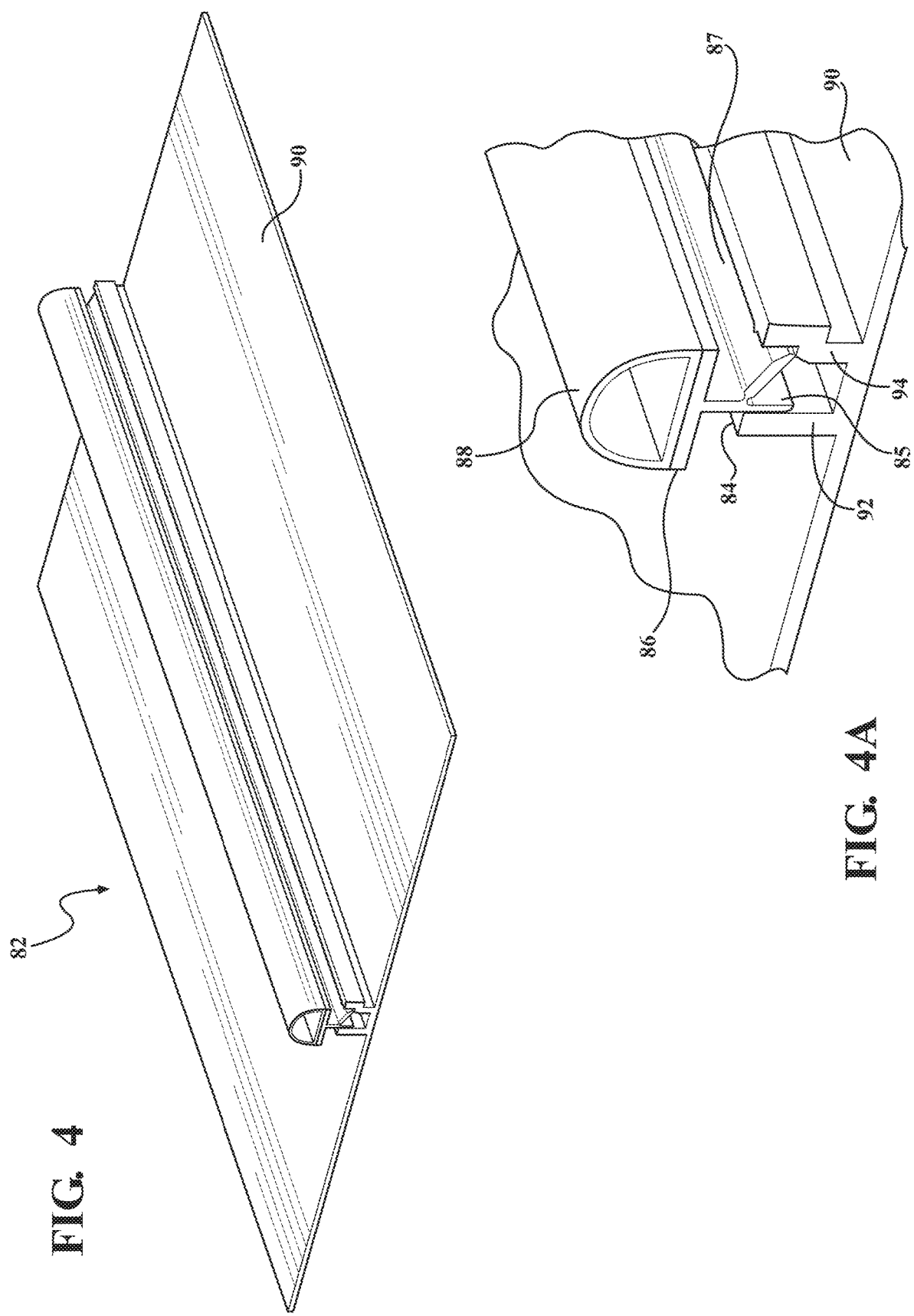

FIGS. 4 and 4A are a pair of overall and enlarged perspectives of a further application of the press fit closure assembly, generally at 82, and again including an inserting profile 84 (with flange 85 and pivoting/hinged wing 87) which is configured within a base 86 of an extruded seal 88. A receiving profile is incorporated into a second piece in the shape of a molded panel 90. The receiving profile, similar to the arrangement described in FIG. 1 and as best shown in FIG. 4A, depicts a pair of planar 92 and stepped 94 spaced apart projections which receives the inserting profile (flange and hinged wing portion) in a similar fashion. Although not shown, the hidden inside face of the stepped receiving profile 94 may further include an inside arrangement of collapsible ribs or barbs (of any suitable configuration) which provides the desired over-center engagement of the hinged wing 87 concurrent with the planar flange 85 seating against the opposing surface of the planar extending pillar 92.

Figure 5:
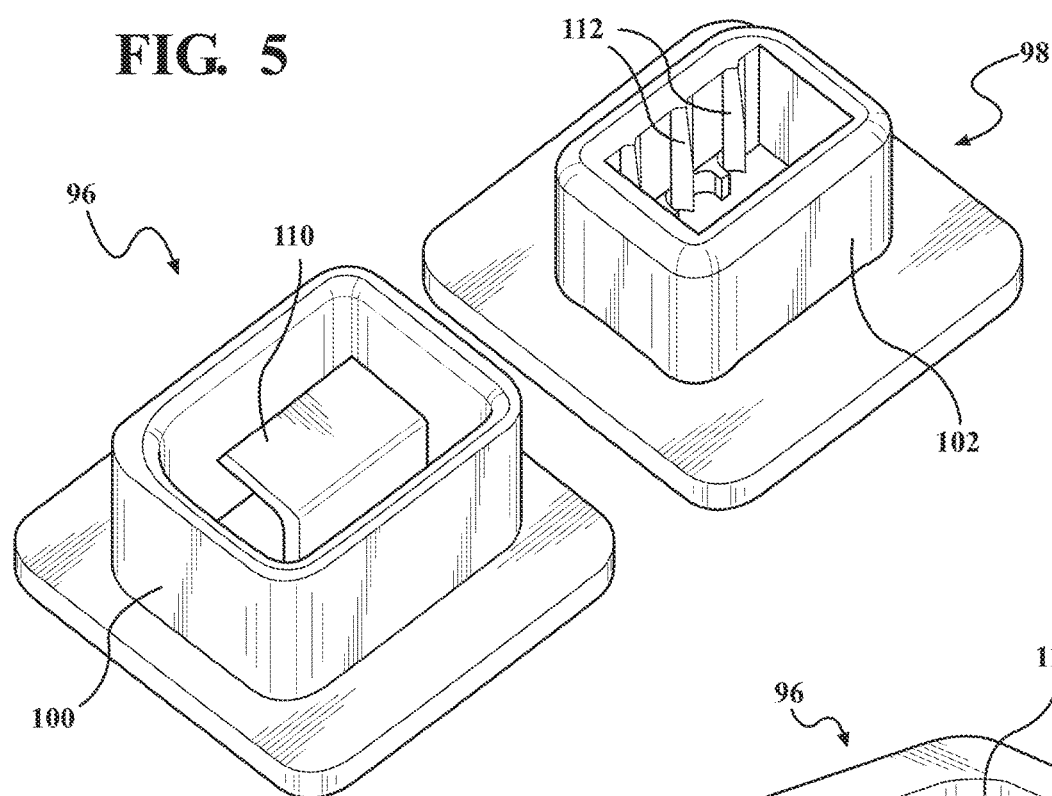
FIG. 5 is an exploded and side by side illustration of a further variant of a press fit closure, this in the form of opposing rivet style portions and in which an inner face of an outer perimeter profile of the inserting portion coaxially seats around a pair of upwardly projecting and spaced apart interior cavity defining surfaces associated with a receiving profile, the inserting portion further including a substantially "L" shaped hinge portion extending from an inner top edge of the inserting portion and engaging collapsible barbs configured along a vertical and intermediate stepped defining ledge of the receiving portion.

FIG. 5 is an exploded and side by side illustration of a further variant of a press fit closure, this in the form of opposing rivet style portions, at 96 and 98, and in which the first portion 96 is configured with an inserting profile, with the second opposing portion 98 likewise exhibiting a receiving portion. The first portion 96 further exhibits an outer perimeter extending profile 100 of the inserting portion coaxially which seats around any of perimeter extending receiving profile 102 (or alternately a pair of parallel spaced apart and upwardly projecting and spaced apart interior cavity defining surfaces) associated with a receiving profile.

As further shown in FIG. 6, the inserting portion further includes a substantially "L" shaped hinge portion extending from an inner top edge location 106 of the inserting portion, the leg including a vertically extending portion 108 and an angled horizontal extending end portion 110. A plurality of engaging and collapsible barbs, shown at 112, are configured along a vertical extending and intermediate stepped defining ledge (see as best shown at 114 in FIG. 6) associated with an inwardly facing edge of the receiving portion defined perimeter 102. As previously described, the crush barbs can exhibit any desired profile and, as depicted at 112, can include an upper most chamfer 113 which narrows from an upper location of the barb before terminating at a vertical midpoint into a sharpened edge 115.

Figure 6A:
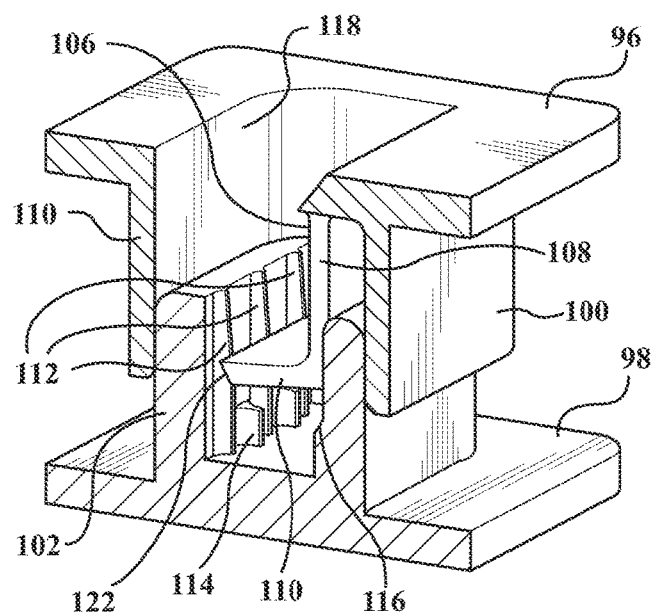
FIG. 6A is an enlarged cutaway perspective of the two piece rivet style fastener of FIG. 5 in an intermediate installation position with the over center "L" shaped leg and outer perimeter guide profile of the inserting portion fitted over the inner seating projections of the receiving portion.

An opposing inner spaced surface of the receiving profile perimeter 102 further depicts an intermediate crush ramp 116 depicted in FIG. 6A (as will be further explained this can also be configured as a solid ramped location), with the "L" shaped hinge or leg (108/110) displacing relative to an inside surface of the inserting portion perimeter profile 100 (depicted in FIG. 6A cutaway as spaced apart flange locations) so that the receiving perimeter profile is seated inwardly of the inserting profile perimeter walls/flanges for establishing contact with the collapsible barbs and the crush ramp.

Figure 5A:
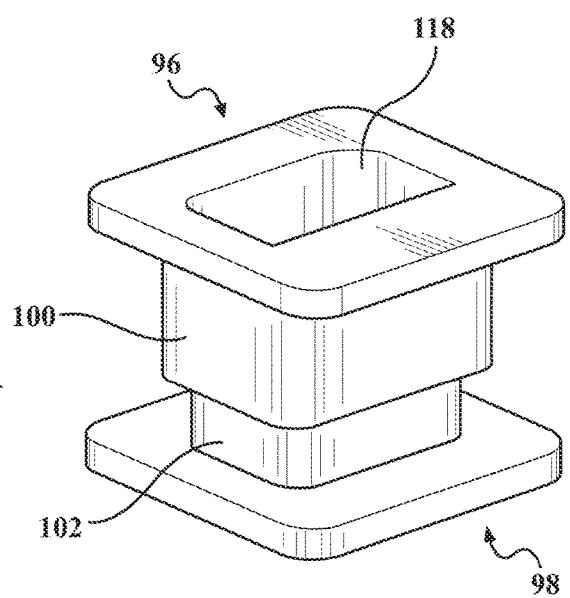
FIGS. 5A and 5B illustrate a pair of assembled positions of rivet style portions of FIG. 5, an in which a first inserting portion panel (FIG. 5A) requires an interior surface defined aperture for forming over the hinged leg, with the underside of the second panel (FIG. 5B) requiring no apertures and which can therefore be exhibited as a show surface.
Figure 5B:
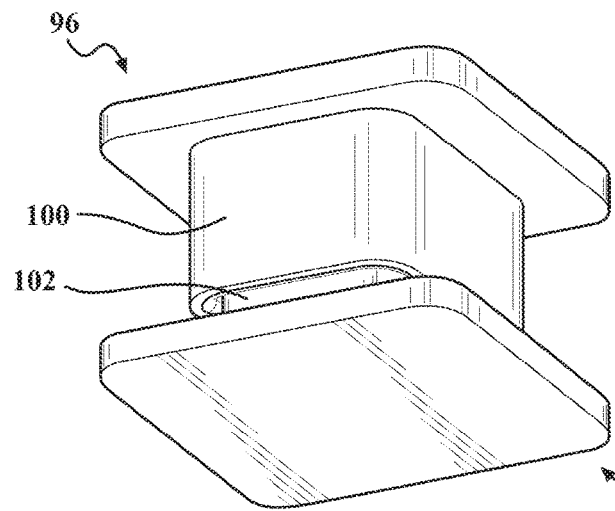

FIGS. 5A and 5B illustrate the pair of assembled positions of rivet style portions of FIG. 5, an in which the first inserting rivet style portion 96 or panel (FIG. 5A) requires an interior surface defined aperture (see perimeter edge 118 defined in its upper surface) for forming over the hinged leg (108/110). The underside of the second panel or portion 98 (FIG. 5B) is noted to not require any apertures, and which can therefore be exhibited as a show or display surface.

Figure 6B:
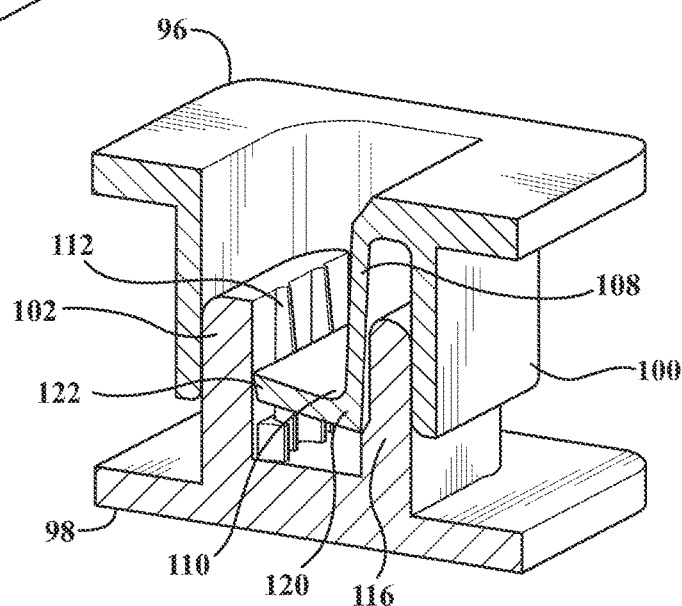
FIG. 6B is a succeeding and intermediate engaged position in which the over center "L" shaped leg is pivoted about a lower conjoining edge between the horizontal and vertical extending portions, and concurrent with the extending tip of the horizontal leg engaging the vertically configured receptacle surface barbs in an undercut defining condition.

FIG. 6B is a succeeding and intermediate engaged position in which the over center "L" shaped leg is pivoted at portion 110 pivoting relative to portion 108 via hinge location 120 which is configured about a lower conjoining edge between the horizontal 110 and vertical 108 extending portions, and occurring concurrent with an extending tip 122 of the horizontal leg engaging the vertically configured receptacle surface barbs 112 in an undercut defining condition. At this position, the angled joining edge of the leg portions 108 and 110 is in contact with a projecting upper edge location of a ramp portion 116 of the perimeter wall 102.

Figure 6C:
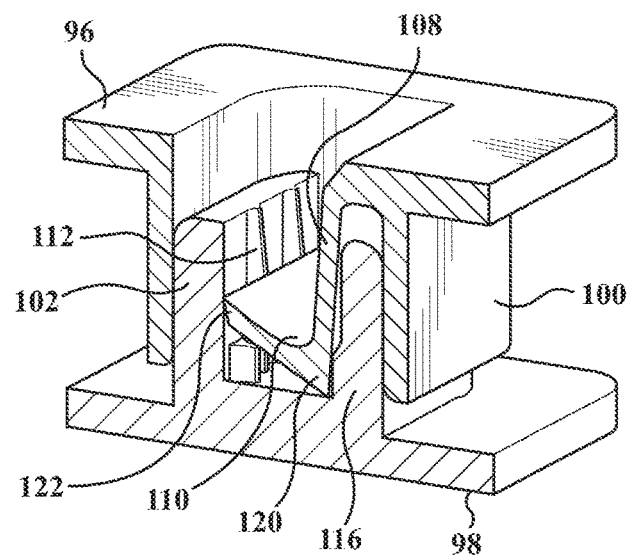
FIG. 6C is a fully engaged illustration in which the end extending portion of the leg travels further into the receptacle undercut, creating an additional over-center engagement.

FIG. 6C succeeds the position of FIG. 6B and depicts the lower leg portion 110 being over rotated by forced displacement or "kicking out" of the leg by the progressive downward displacement along the vertical ramp 116. At this position, the leg portions are fully engaged with the end extending portion 110 of the leg travelling further into the receptacle undercut (caused by crushing of the contacting barb locations and forcing the tip 122 of the horizontal leg 110 into the opposing vertical barbs 112), thereby creating an additional over-center engagement. As previously indicated, it is further understood that the rear inner surface located ramp 116 can be either solid or partially crush-collapsible, this in order to ensure adequate driving motion of the horizontal leg 110 into a secure engagement within the receiving cavity profile consistent with the forced outward and over center pivoting of the horizontal extending portion 110 of the "L" shaped leg in order to ensure affixation within the cavity profile of the second mounting material.

Beyond the embodiments described, additional variants can include the provision of an external tool which supports, at an inserting end, a smaller sized fastener reconfigured with an inserting profile. A base receiving surface can likewise exhibit a variation of receiving profile drawn from that disclosed above. It is further envisioned that aspects of the undercut engaging profile or over-center rotation of a hinged wing associated with the inserting profile can further be assisted or supplanted by the dimensioning of the inserting tool outwardly deflecting the vertical surfaces of the receiving profile, such as occurring simultaneously with the insertion of the tool tip with end supported inserting profile exhibiting portion. In such a configuration, subsequent retracting of the tool results in the receiving profile surfaces closing around the insert profile of the first engaging portion.

One such example of the above referenced is shown generally at 124 with reference to FIG. 7, which provides an illustration of a non over-center engagement configuration according to a further variant in which a projecting J hook configuration of a first mounting material 126 is received within a recess cavity of a second material 128. The "J" hook is depicted by vertical extending portion 130 which is secured at a perimeter defining inner edge 132 of the first material, such creating a window in the first material which reveals a curved bottom profile 134 of the "J" hook and which terminates in a pointed or flared engagement tip 136.

As further shown in the cutaway view of FIG. 7A, the second mounting material 128 further includes a perimeter defining wall 138 which exhibits an interior for receiving the "J" hook in a downwardly/inwardly inserting direction. A plurality of crush barbs, such as shown extending vertically at 140, are configured upon an inner facing surface of the receiving and cavity defining perimeter of the second lower mounting material 128 and which are opposed by the engagement tip 136 of the "J" hook. As with the preceding embodiments, the crush barbs 140 can exhibit any type of tapered or other narrowed configuration in end profile and which, in response to biasing engagement of the tip 136 of the inserting portion, causing an undercut forming deformation of the crush barb at the contact location in order to secure the pieces or layers together.

Figure 8A:
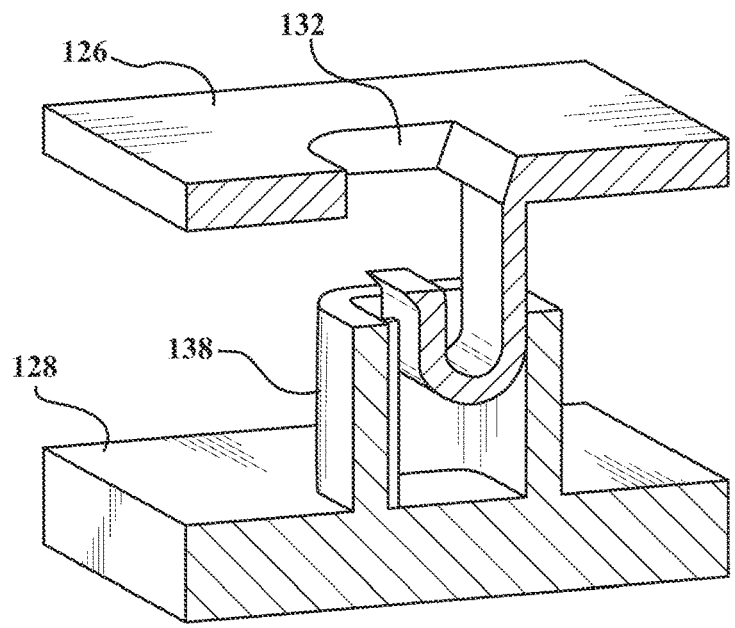
FIGS. 8A-8E present a series of illustrations of the J hook configuration of FIG. 7 and illustrating, in succession, insertion of the J-hook portion into the receptacle cavity, following which an anvil installation tool is inserted through a receiving aperture in the first material in order to deflect the engagement tip of the J-hook portion into a crush configuration with the vertical barbs configured in the receptacle cavity, following which the anvil is removed with the materials thereafter bonded unless sufficient disengagement force is exerted to the J-hook to shear away from the crush barbs.
Figure 8B:
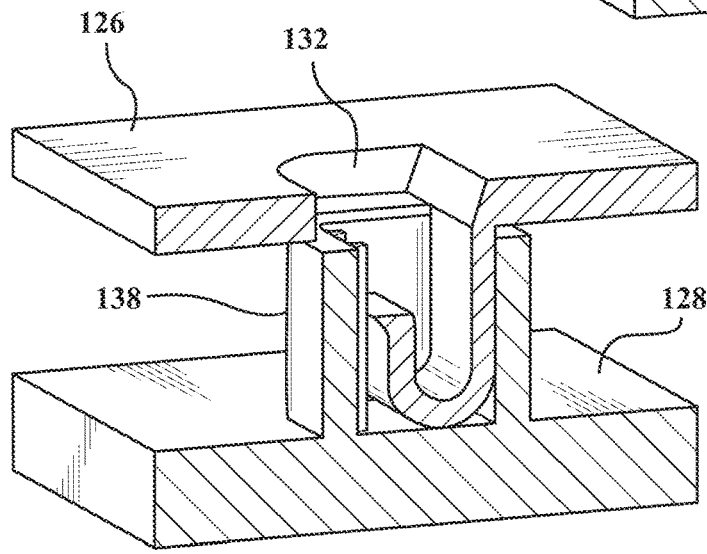
Figure 8C:
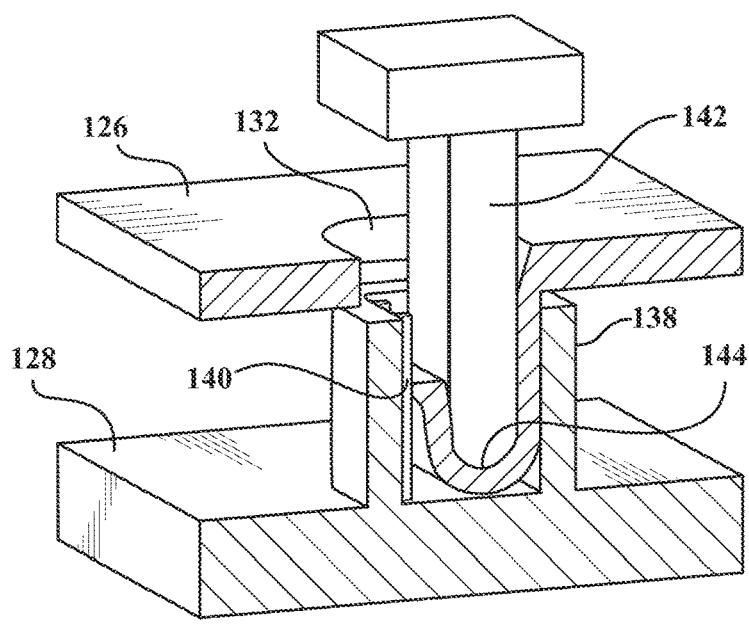

FIGS. 8A-8E present a series of illustrations of the J hook configuration of FIG. 7 and illustrating, in succession, insertion of the J-hook portion into the receptacle cavity, this initially depicted in FIGS. 8A and 8B in which the first material molded J-hook is inserted into the receptacle cavity and is deflected to a minor degree which precedes actual crushing or collapsing of the barbs 140. FIG. 8C depicts the insertion of an anvil style tool, at 142, which is inserted through the receiving window 132 of the upper mounting material 126. The tool 142 exhibits an elongated body and has a configured bottom profile 144 which seats within the inner curved profile 134 of the "J" hook portion.

Figure 8D:
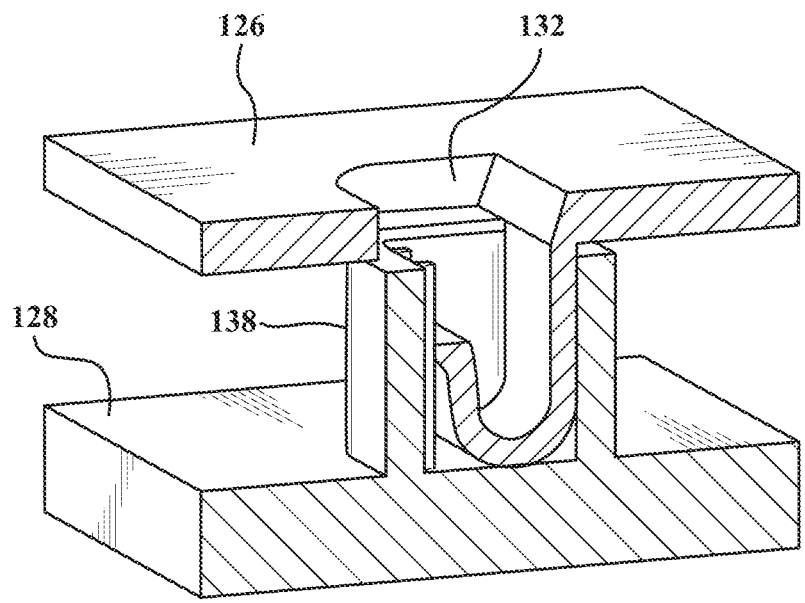
Figure 8E:
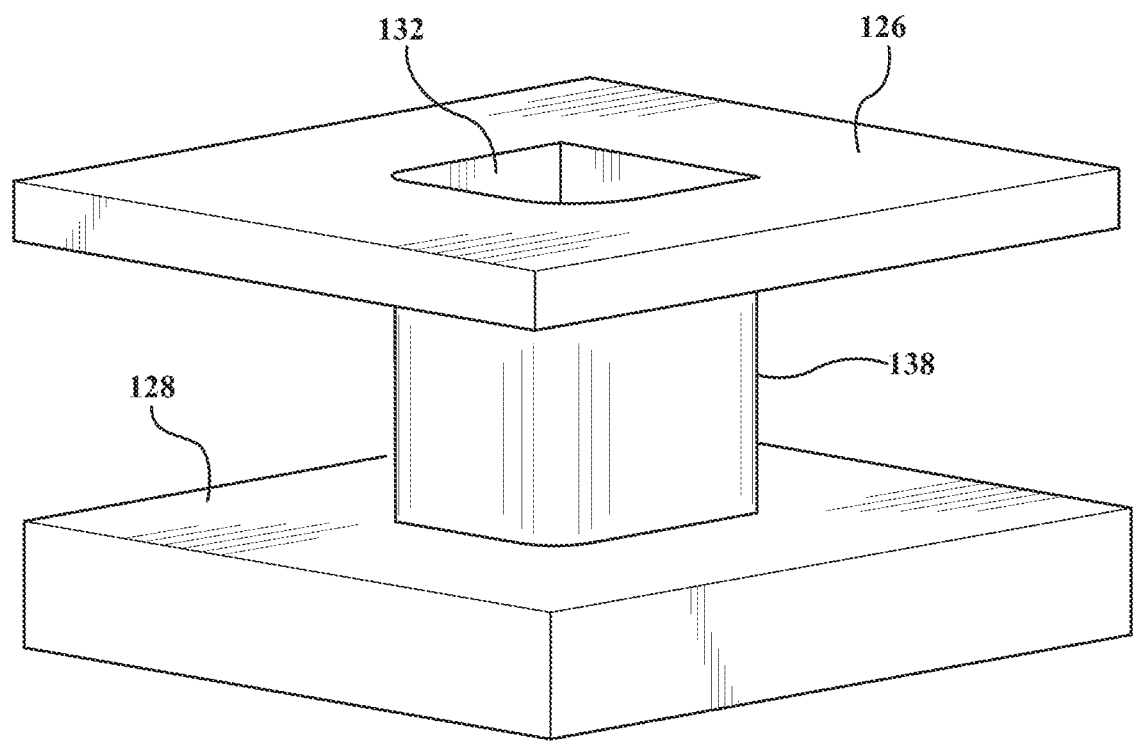

Upon being seated in the position of FIG. 8C, the anvil 142 is driven or depressed downwardly in order to deflect the engagement tip 136 of the J-hook portion into a crush configuration with the vertical barbs 140 configured in the receptacle cavity, such further occurring without any hinged or over-center deflection of the "J" hook. Reference is made specifically to FIG. 8D and which depicts the undercut formation into the crush barbs 140 by the actuated tip 136 of the "J" hook.

Following removal of the anvil (FIG. 8D cutaway) the materials are thereafter bonded unless sufficient disengagement force is exerted to the J-hook to shear away from the crush barbs. This design of FIGS. 7-8 provides surface compatible sealing from one side of the materials, combined with low insertion force (FIGS. 8A-8B) and high extraction (shear failure) force.

Figure 9:
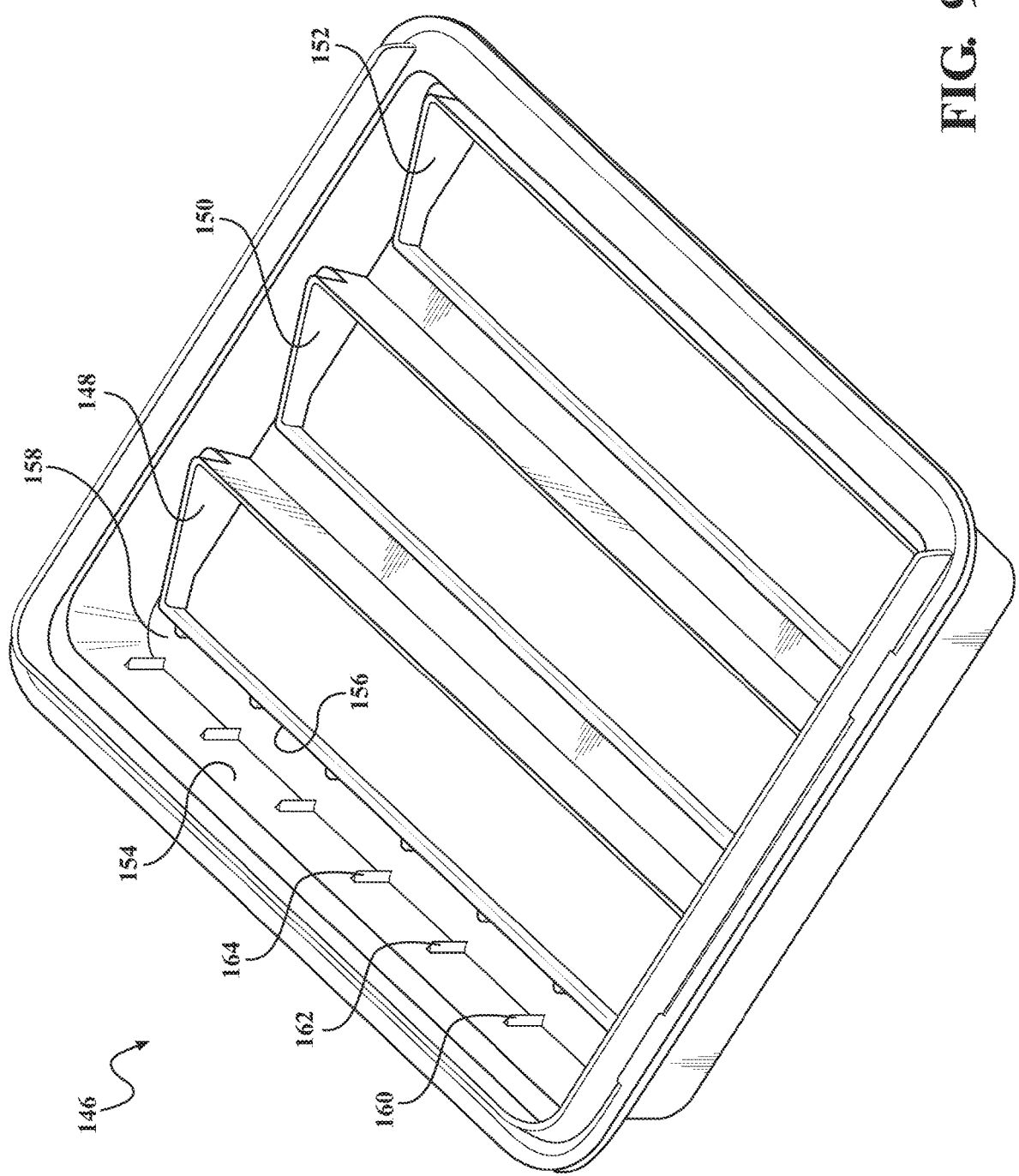
FIG. 9 is an illustration of a rigid plastic ventilation tray including crush rib receiving structure for engaging a rigid mounting base of a coextruded soft flap which is attached to each window or aperture defined in the frame construction of the ventilation tray.

FIG. 9 is an illustration, generally at 146, of a plastic ventilation frame (also termed tray) having a selected rigidity, according to a further embodiment. The tray 146 includes an outer frame within which are defined any number of elongated passageway defining windows or interior apertures (see inner perimeters defined at 148, 150 and 152 and which, as will be described, support flexible flaps or membranes for accomplishing opening and closing of the passageways).

Figure 10A:
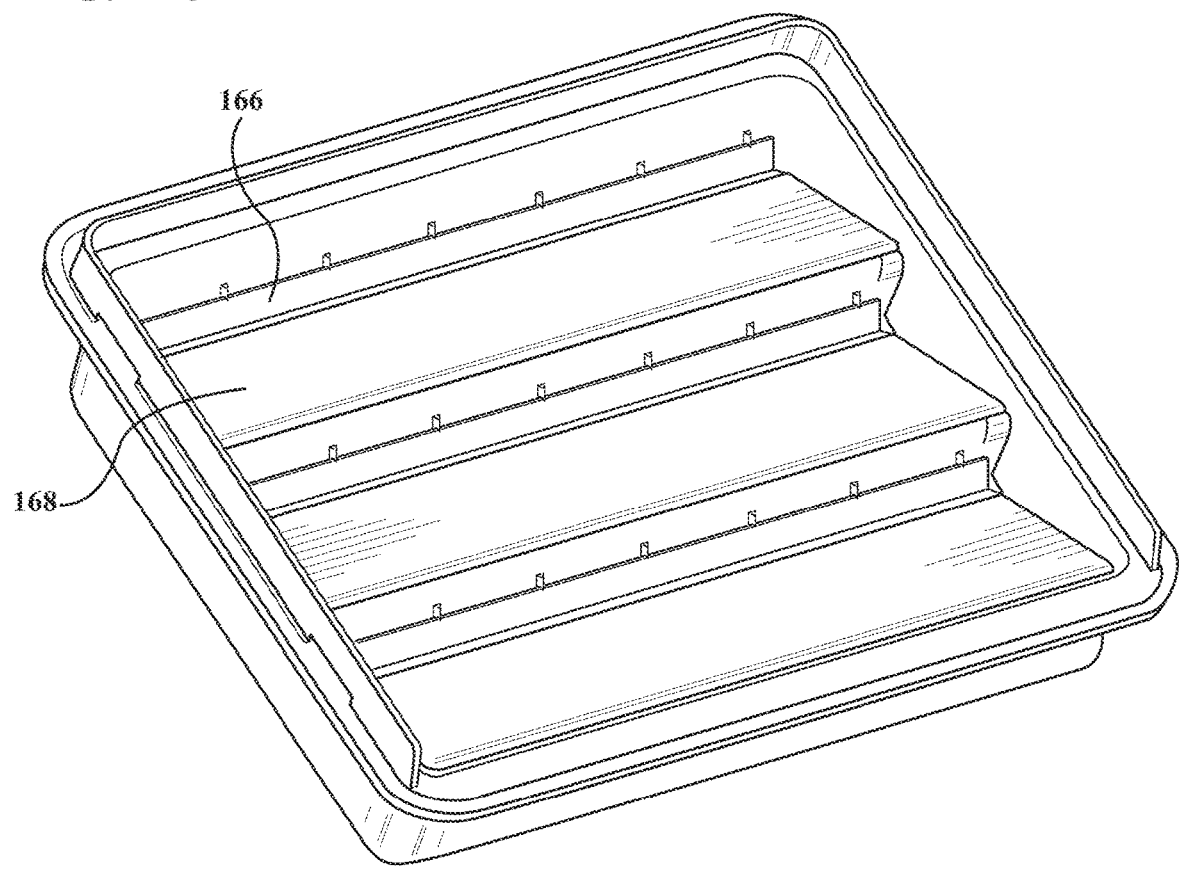
FIGS. 10A-10D present a series of illustrations of the embodiment of FIGS. 9 and 9A including an overall assembled perspective of the tray and engaged co-extruded flaps (FIG. 10A), sectional perspective of the coextruded flap (FIG. 10B), enlarged cutaway cross section of the receiving tray trough (FIG. 10C), and substantial re-presentation of the receiving tray of FIG. 9 (FIG. 10D) depicting crush rib structure molded into the trough receptacle.
Figure 10B:
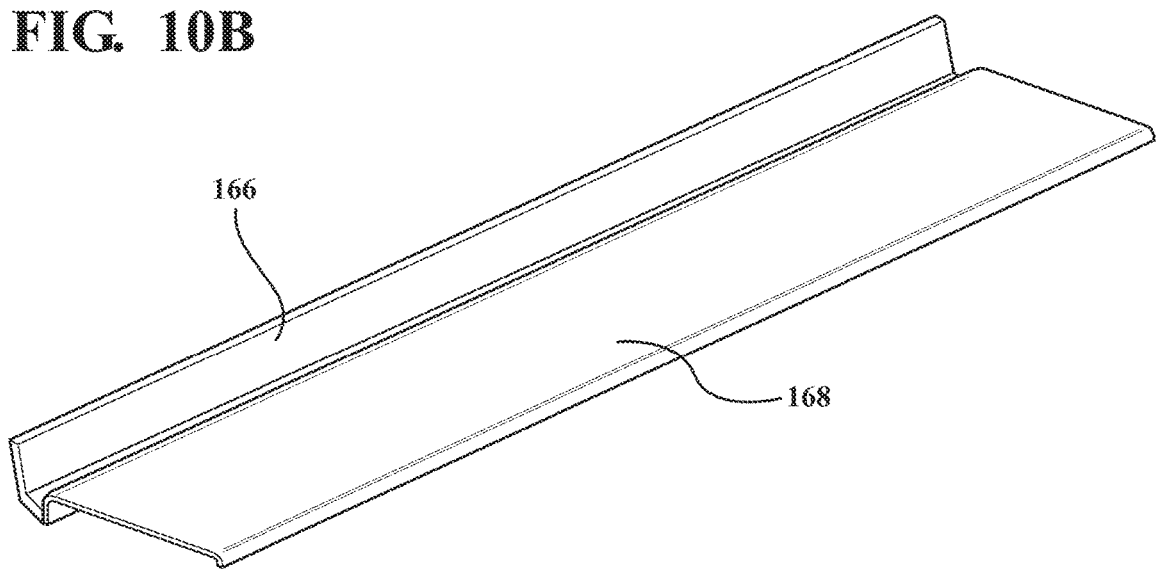
Figure 10C:
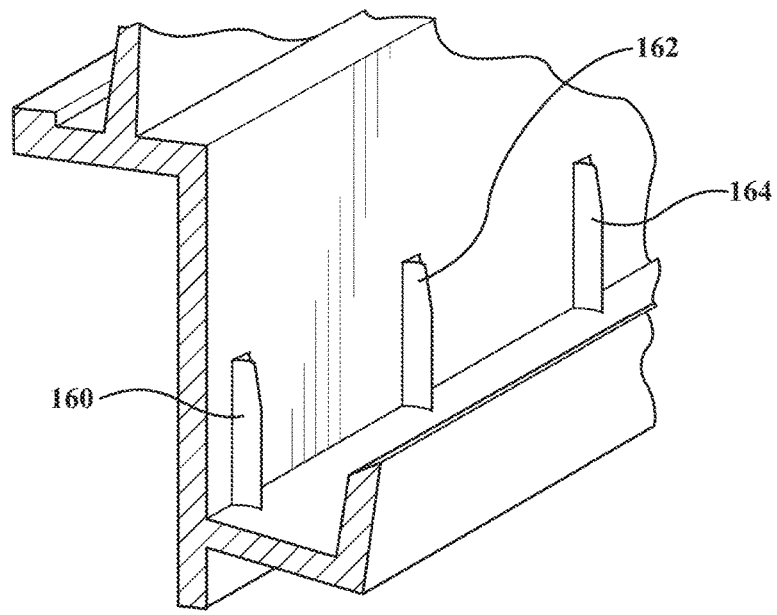
Figure 10D:
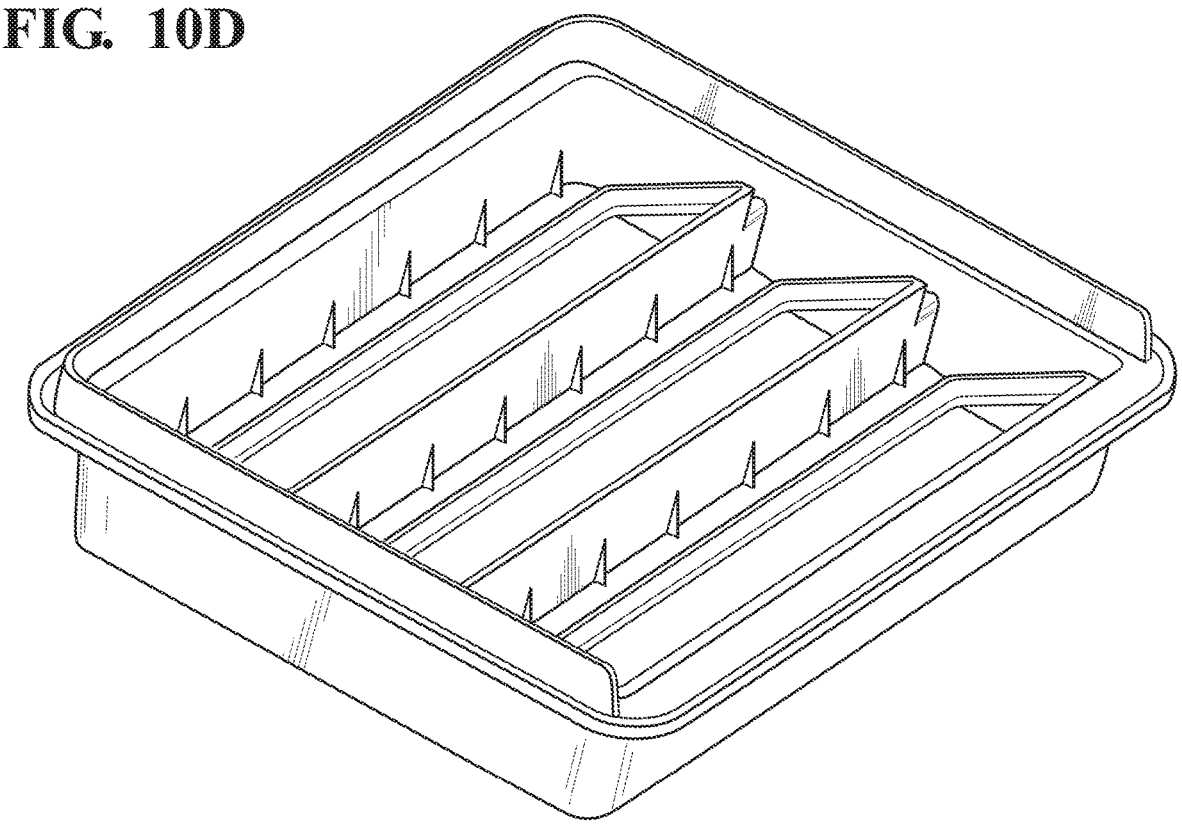

The interior of the tray defines a recessed trough in proximity to each of the windows, this depicted by trough inner side surfaces 154 and 156 interconnected by bottom surface 158 adjacent selected passageway window 148. As with the previously disclosed embodiments, the tray variant includes similar structure for providing crush collapse of plasticized barbs, see at 160, 162, 164, et seq., which are positioned within the trough in vertical projecting fashion along the inner side surface 154. As will be described, the crush rib receiving structure engages a rigid mounting base, at 166, of a coextruded soft flap, further at 168 (see also FIGS. 9A, 10A and 10B), which is attached to each window or aperture defined in the frame construction of the ventilation tray.

FIG. 9A is an enlarged perspective cutaway of the tray of FIG. 9 and depicting, in combination, the coextruded flap engaged to the receiving trough location associated with the selected aperture 148. Also shown in FIG. 9A is the undercut profiles 163/165 which are formed into the selected crush barbs 162/164 by the engaging action of the rigid mounting base 166 upon the same being deflected into engagement with the crush ribs in order to mounts the flap 168 over the defined opening in the ventilation tray.

FIGS. 10A-10D further present a series of illustrations of the embodiment of FIGS. 9 and 9A, this including an overall assembled perspective of the tray and engaged co-extruded flaps (FIG. 10A), sectional perspective of the coextruded flap (FIG. 10B), enlarged cutaway cross section of the receiving tray trough (FIG. 10C), and substantial re-presentation of the receiving tray of FIG. 9 (FIG. 10D) depicting the crush rib structure (again at 160, 162, 164, et. seq.) molded into the trough receptacle. As with the other embodiments depicted, the arrangement of the crush barbs in the first cavity defining piece, in combination with the inserting portion (e.g. rigid mounting base 166) of the second layer combine to provide an effective structure for securing the soft/flexible flap 168 which is secured to the base 166 in relation to each of the defined window openings 148, 150, 152 in the rigid tray.

Figure 11C:
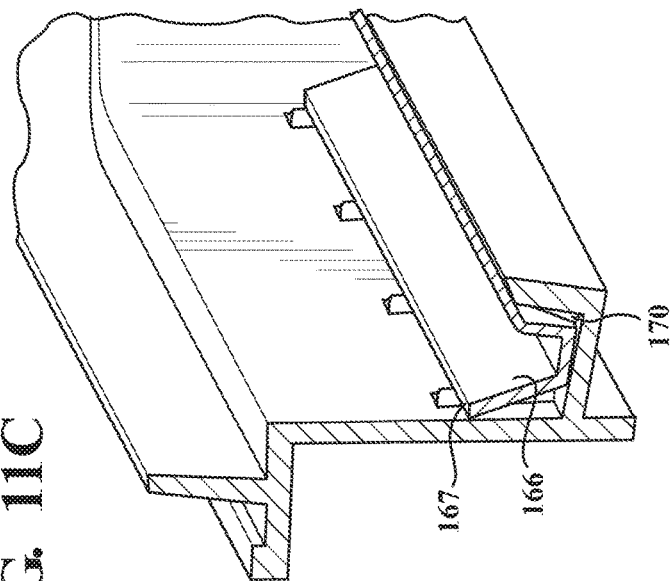
FIGS. 11A-11C illustrate a progression of views of the more rigid durometer three sided base portion of the coextruded flap (with only a joining edge portion of the softer durometer flap being shown), the multi-sided profile establishing a further configuration of "J" hook mounting profile which cooperates with the vertical crush barb profiles defined along a rear surface of the trough for engaging the mounting portion in place, in combination with a combination of the compressing force along the forward vertical face of the trough and the application of an appropriate installation tool for deflecting the rear side of the base portion into collapsing engagement of the opposing barbs.
Figure 11B:
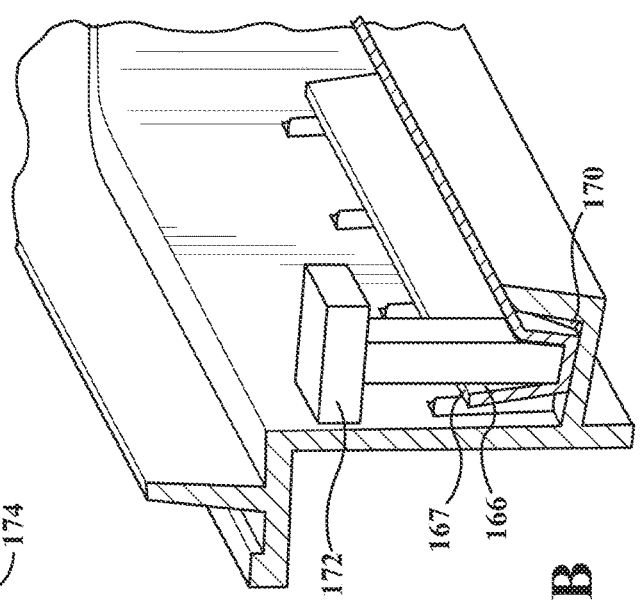
Figure 11A:
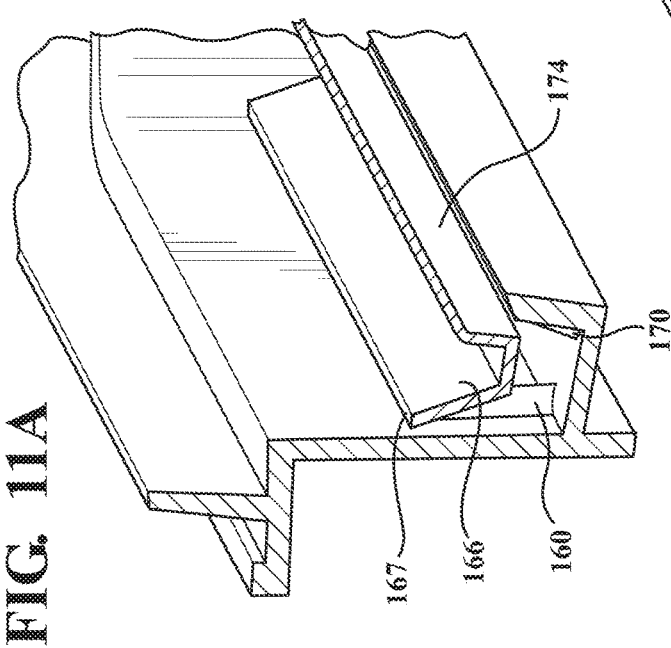

FIGS. 11A-11C illustrate a progression of views of the more rigid durometer three sided base portion 166 of the coextruded flap (with only a joining edge portion of the softer durometer flap being shown). The multi-sided profile of the base portion 166 (see three angular interconnecting sides in side profile as shown) establishes a further configuration of "J" hook mounting profile with an extending edge 167 of a first of the interconnected sides cooperating with the vertical crush barb profiles 160, 162, 164, et. seq. defined along the rear and inner facing side surface 154 of the trough for engaging the mounting portion in place. In combination, an opposing compressing force is exerted against an opposite angled edge of the base portion 166, such being along the opposing and forward inside vertical face 156 of the trough base projection 170.

An appropriate installation tool, such as shown at 172 in FIG. 11B and exhibiting a flattened depressing face, is provided for deflecting the forward angled edge 167 of the angled outer profile side or leg (J-hook profile) of the base portion 166 into collapsing engagement of the opposing barbs (see FIGS. 9A and 11C), such occurring concurrent with an opposite outer face of the opposite profile side or leg of the base portion (see at 174 in FIG. 11A) biasing against the inside vertical face 156 of the trough as further defined by base projection 170, thereby causing the interconnected rear leg of the J hook profile to bend forwardly into contact with opposing wall. In this manner, the crush barbs 160, 162, 164, et seq. are collapsed in the manner shown in order to retain the more rigid three sided base 166 of the coextruded flap in place, with the coextruded and softer durometer flap portion 168 covering the upper lip edges associated with the window perimeter 148.

Figure 12A:
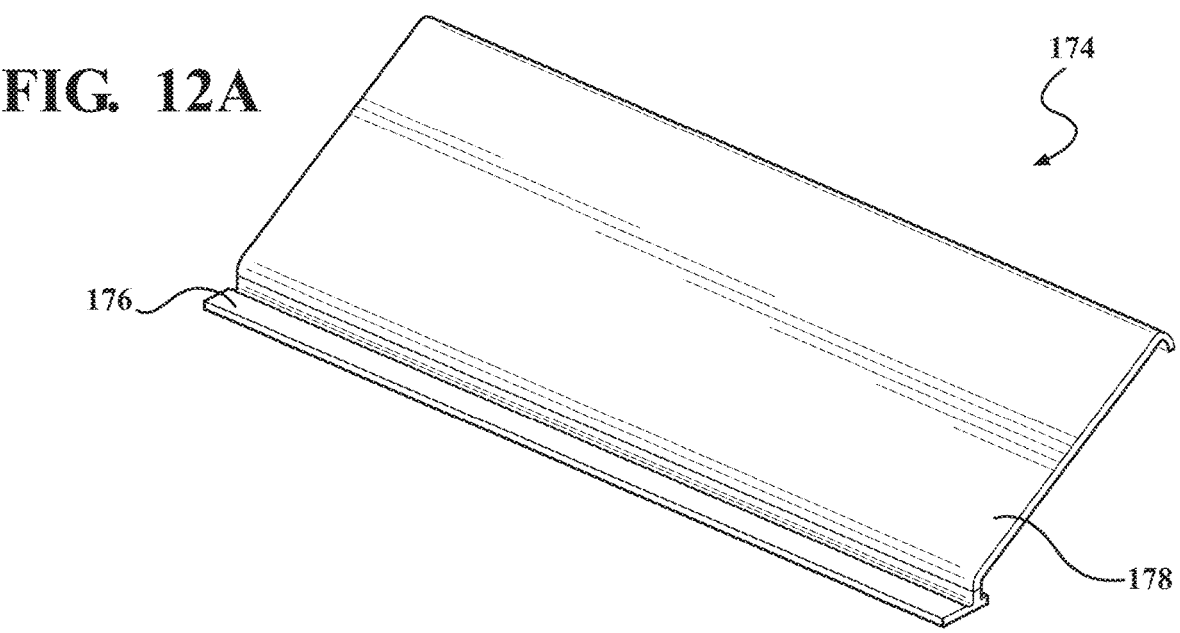
FIGS. 12A-12D illustrates a progression of views of an alternate configuration of receiving tray and coextruded engageable flap (FIG. 12A), and in which the tray includes an alternate configuration of crush barbs arranged on a forward vertical trough defining face (FIG. 12B), in combination with a redesign of the more rigid durometer base portion of the coextruded flap with hinged tail (FIGS. 12C-12D) which is initially bent upwardly during initial installation of the flap (FIG. 12C), following which the tail is pressed downwardly with an appropriate installation tool (FIG. 12D), thereby pushing the tip of the flap or leg into undercut collapsing engagement with the opposing crush barbs.
Figure 12B:
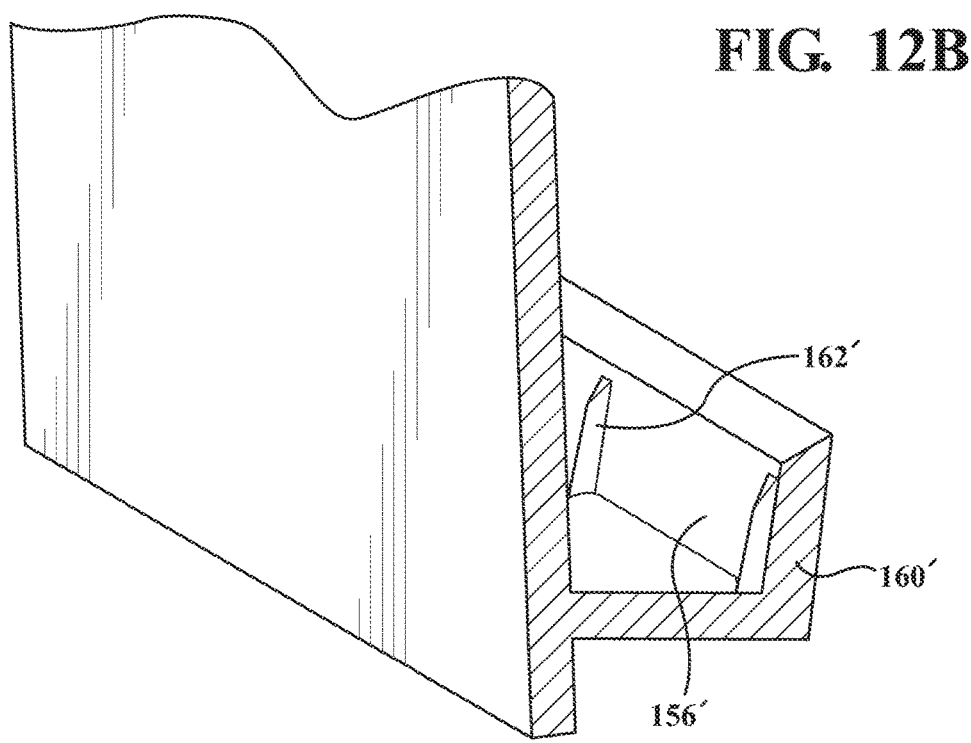

FIGS. 12A-12D illustrates a progression of views of an alternate configuration of receiving tray and coextruded engageable flap (the flap generally shown at 174 and including a more rigid durometer base 176 of a more T shaped profile, at 174 in FIG. 12A with softer flap 178). The tray as previously described in FIG. 9 is reconfigured slightly to exhibit an alternate configuration of crush barbs, see at 160', 162', et. seq., which are arranged on a reconfiguration 156' of the forward and inside facing vertical trough defining face (FIG. 12B).

Figure 12C:
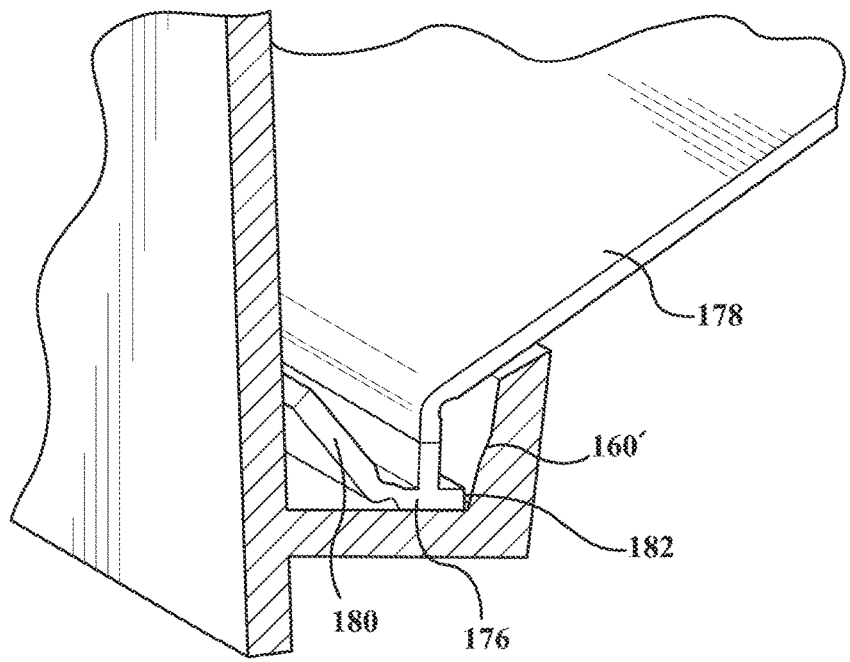
Figure 12D:
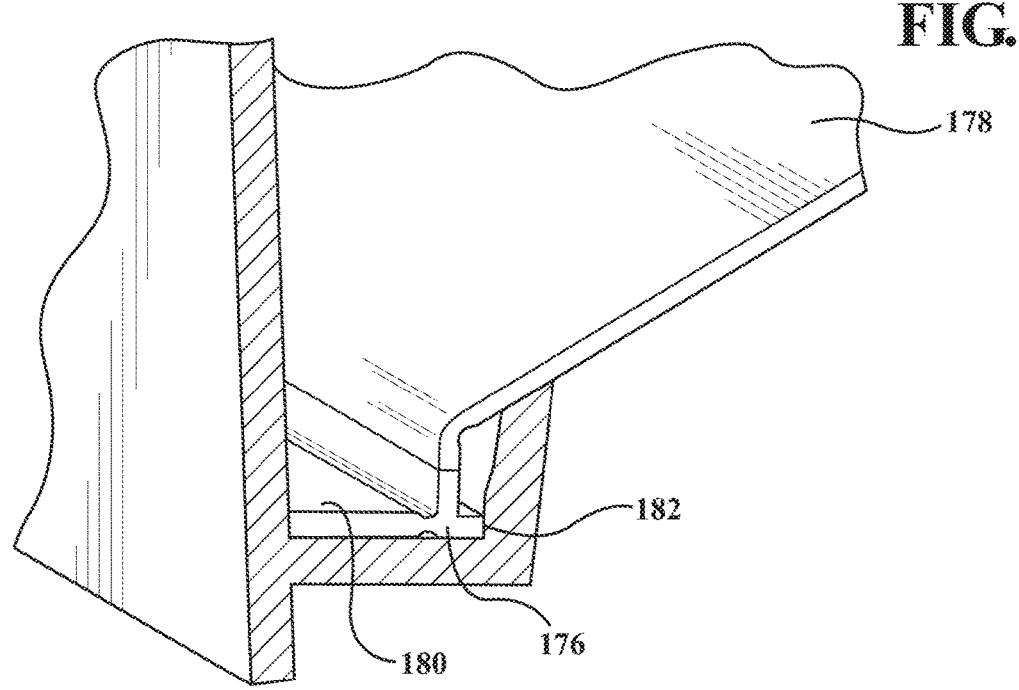

In combination, a redesign is provided of the more rigid durometer base portion of the coextruded flap with hinged tail (reconfigured from that previously shown at 168 in FIG. 9A to a substantially T shape 178 in FIGS. 12C-12D). As best shown in FIG. 12C, a wing portion 180 extends from a hinged location defined with a selected lower leg of the T profile 176 of the harder durometer co-extruded base, with an adjoining edge of the softer durometer flap 178 coextruded to the upper edge of the vertical extending leg defining the upside down T profile of the base portion 176. As depicted in FIG. 12C, the flap, wing or tail 180 is initially bent upwardly during installation of the flap, following which the tail is pressed downwardly with the appropriate installation tool (in position of FIG. 12D) into biasing engagement with the opposing inner facing vertical trough defining surface (corresponding to as shown at 154 in FIG. 9) and such as previously identified by non-limiting example by tool 172 in FIG. 11B), thereby pushing an opposite horizontal edge projecting tip 182 into undercut collapsing engagement with the opposing crush barbs 160', 162' etc.

Figure 13A:
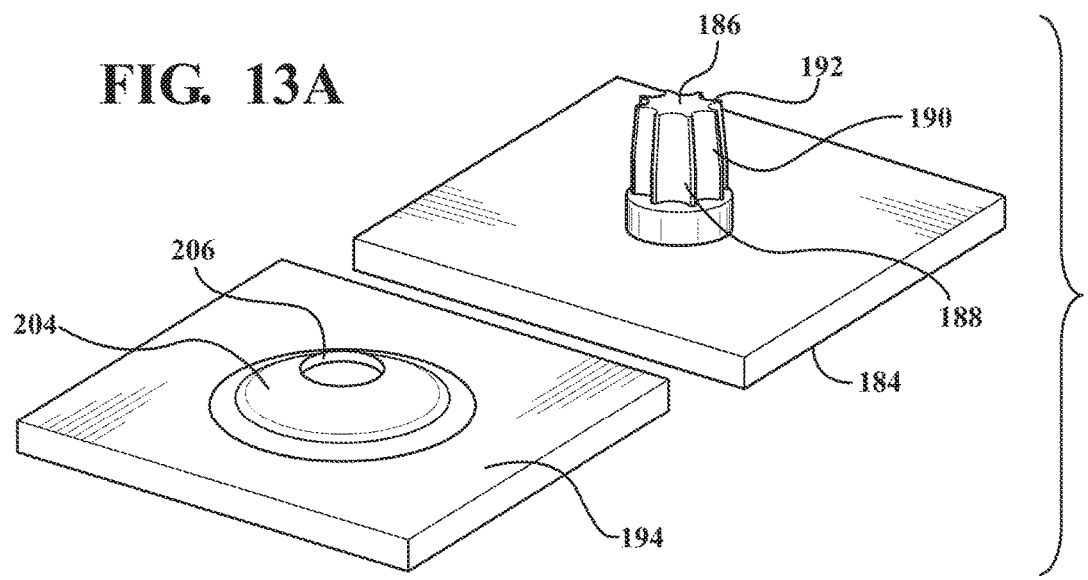
FIGS. 13A-13C depict a series of exploded illustrations of a two piece closure assembly in which an opposite face of a first show (A) surface layer exhibits a post with molded crush barbs, a second engaging layer further including either of radial and/or circumferential hinged areas designed into an over-center ring receiving portion with a central receiving aperture for deflecting the receiving portion of the second layer into an undercut and reverse hinged engagement with the first layer.
Figure 13B:
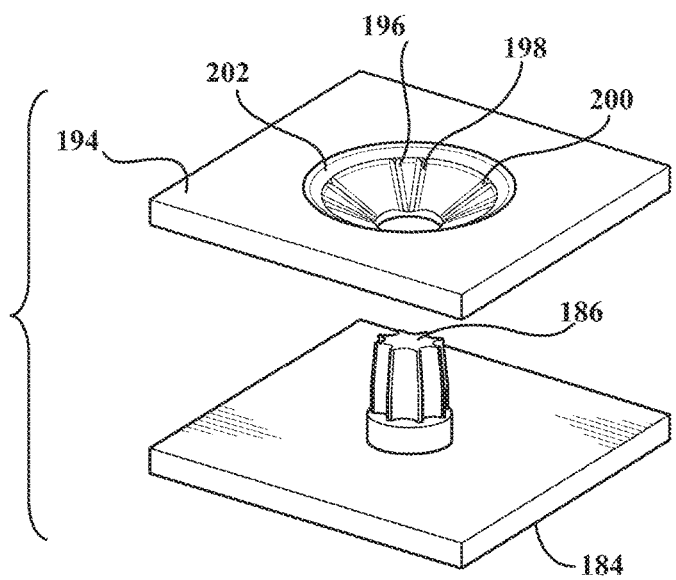
Figure 13C:
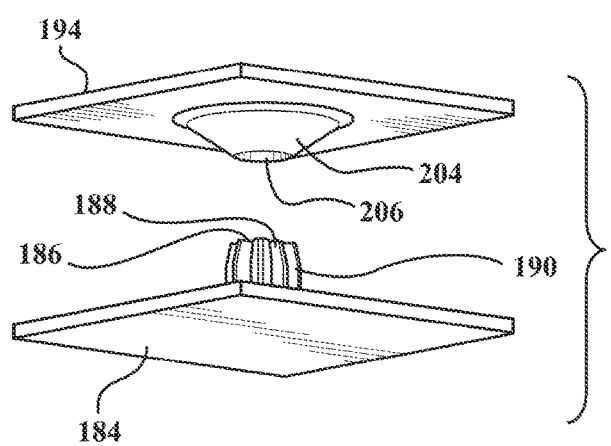

Proceeding to FIGS. 13A-13C, depicted are a series of exploded illustrations of a two piece closure assembly in which a material exhibits a first show (A) surface 184 opposite a mounting surface of a post 186 with circumferentially molded crush barbs 188, 190, 192 et seq. integrated into the outer profile of the post. A further engaging layer or material 194 includes either of plural radial 196, 198, 200, et seq., and/or circumferential 202 hinged areas or edges, these designed into an over-center ring receiving portion (see arcuate three dimensional surface 204) with a central receiving aperture (see inner perimeter 206) for deflecting the receiving portion of the layer 194 into an undercut and reverse hinged engagement with the layer 184.

Figure 14A:
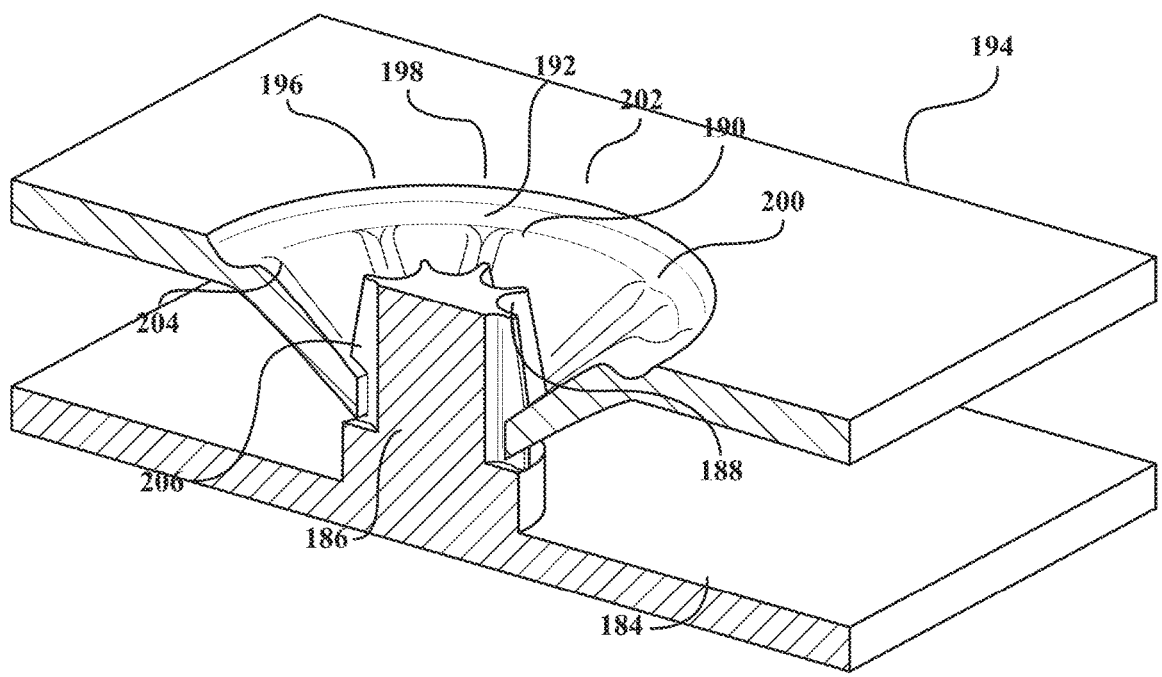
FIGS. 14A-14C illustrate a progression of views of the engagement of the two piece closure assembly of FIG. 13 which, upon the over center ring being installed over the first layer post up to an intermediate ring stop location of the post (FIGS. 14-14A), further downward depressing of the second layer (FIG. 14B) results in an over-center displacement of the over-center ring portion, resulting in crushing of the opposing base locations of the barbs in a diameter reducing fashion, further such that (upon full installation) a significantly greater withdrawal force (FIG. 14C) must be applied in order to flip the over center ring back over center in order to separate the panels.
Figure 14B:
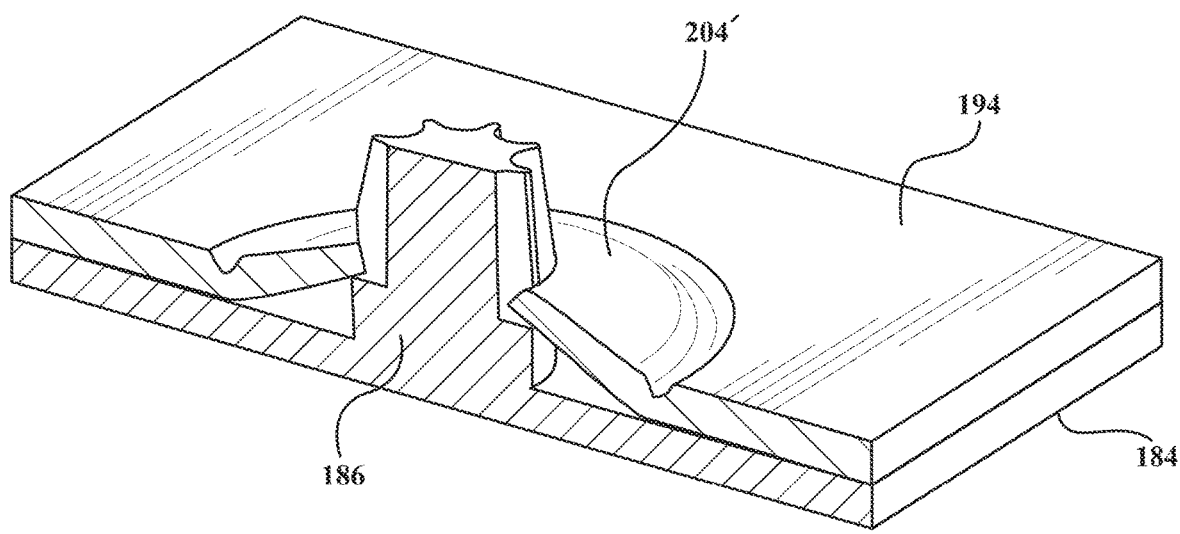
Figure 14C:
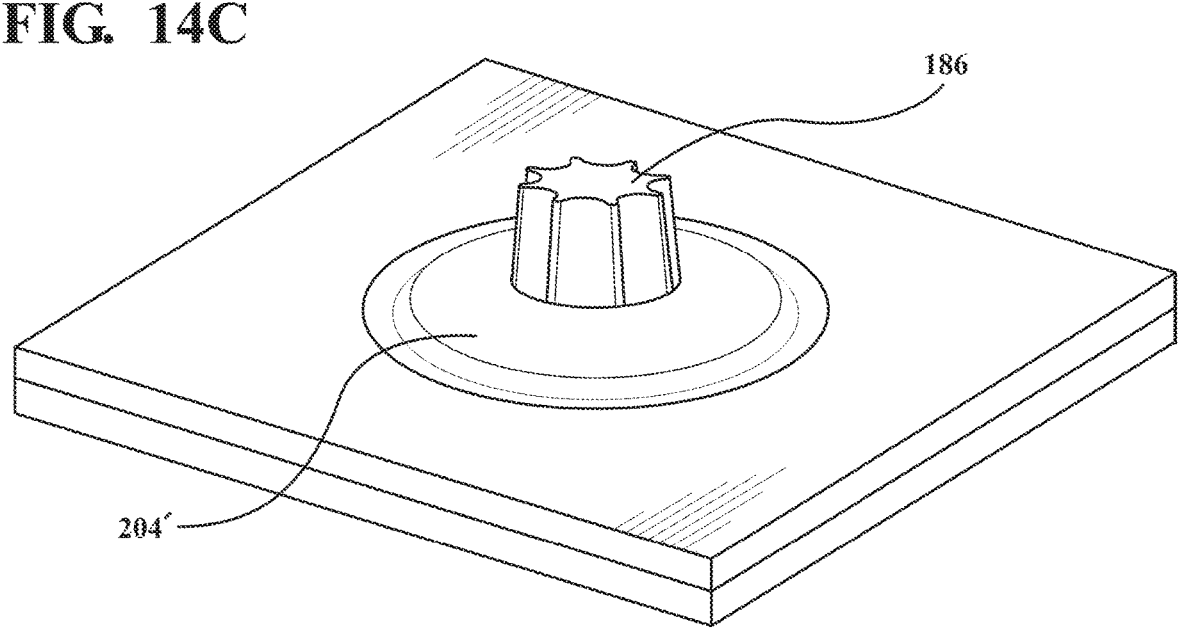

FIGS. 14A-14C illustrate a progression of views of the engagement of the two piece closure assembly of FIG. 13 which, upon the over center ring (arcuate or conical body 204 with inner perimeter edge 206) being installed over the initial material layer 184 and post 186 up to an intermediate ring stop location of the post FIG. 14A. Further downward depressing of the layer 194 (FIG. 14B) results in an over-center displacement of the over-center ring portion (see as now shown at 204'), resulting in crushing of the opposing base locations of the circumferentially arranged barbs 198, 200, 202, et seq., in a diameter reducing fashion, further such that (upon full installation) a significantly greater withdrawal force (FIG. 14C) must be applied in order to flip the over center ring back over center (i.e., from inverted position 204' in FIGS. 14B and 14C back to initial installation position 204 in FIG. 14A) and in order to separate the panels or layers 184 and 194.

Figure 15:
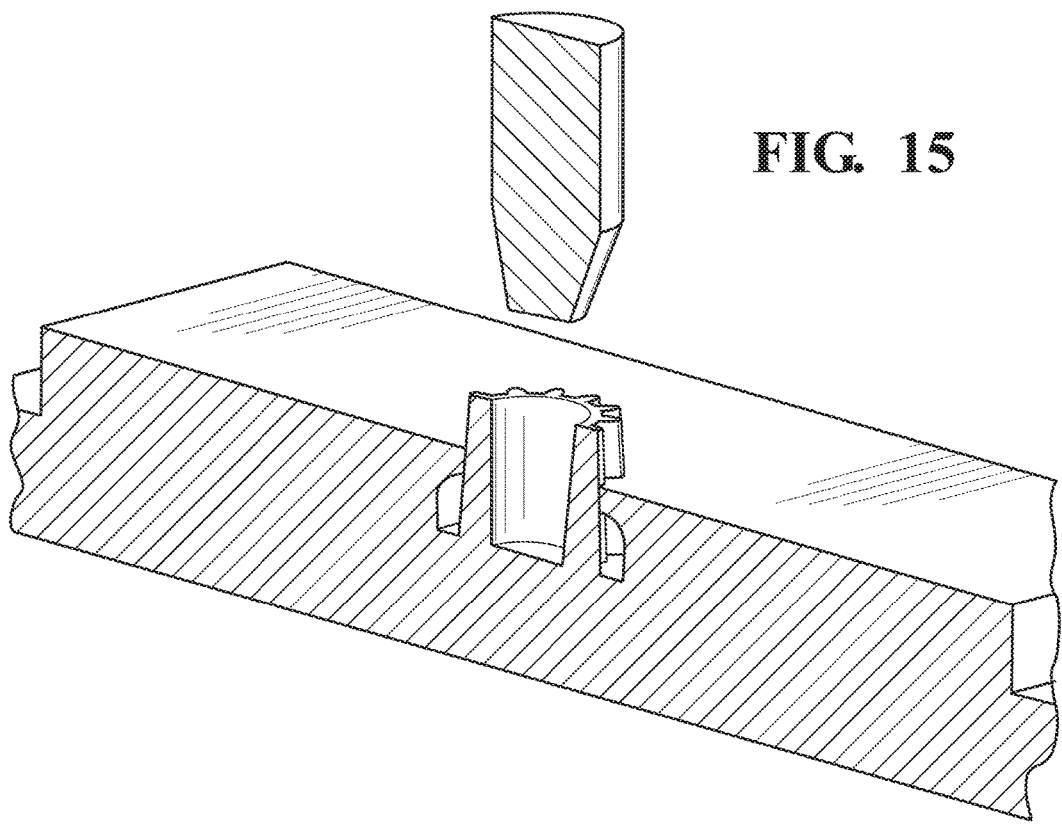
FIG. 15 is an exploded view in cutaway of a further variant of a two piece closure assembly and in which the first piece exhibits a cavity in the form of an inner and undercut defining aperture, the second piece exhibiting an insert portion in the shape of an upward and slightly tapered protrusion which seats through the second piece aperture and, following insertion of a die punch through an open interior of the upward and tapered protrusion, causing a base rim of the protrusion to expand into the undercut portion of the surrounding aperture of the first piece.

FIG. 15 is an exploded view in cutaway, generally at 210, of a further variant of a two piece closure assembly, this including a first piece 212 exhibiting a cavity in the form of an inner and undercut defining aperture, further depicted by an upper aperture location (see enclosed perimeter 214), along with adjoining and undercut (or outwardly expanded) perimeter 216. A second piece 218 exhibits an insert portion in the shape of an upward and slightly tapered protrusion, shown in cutaway at 220 with circumferentially spaced and radially outwardly projecting crush barbs 222 which seat through the aperture 214 with adjoining undercut 216.

A die punch 224 is likewise depicted in length cutaway, such including a tapered lower end 226 which, following insertion of the die punch through an open interior 228 of the upward extending and tapered protrusion seated through the aperture/undercut locations of the upper located piece or layer, causes a base rim of the protrusion (at 232) to expand into the undercut portion of the surrounding aperture of the first piece. In this manner, the pieces are effectively secured together through the outwardly deforming action of the tool within the sleeve shaped and expandable insert portion.

Figure 16:
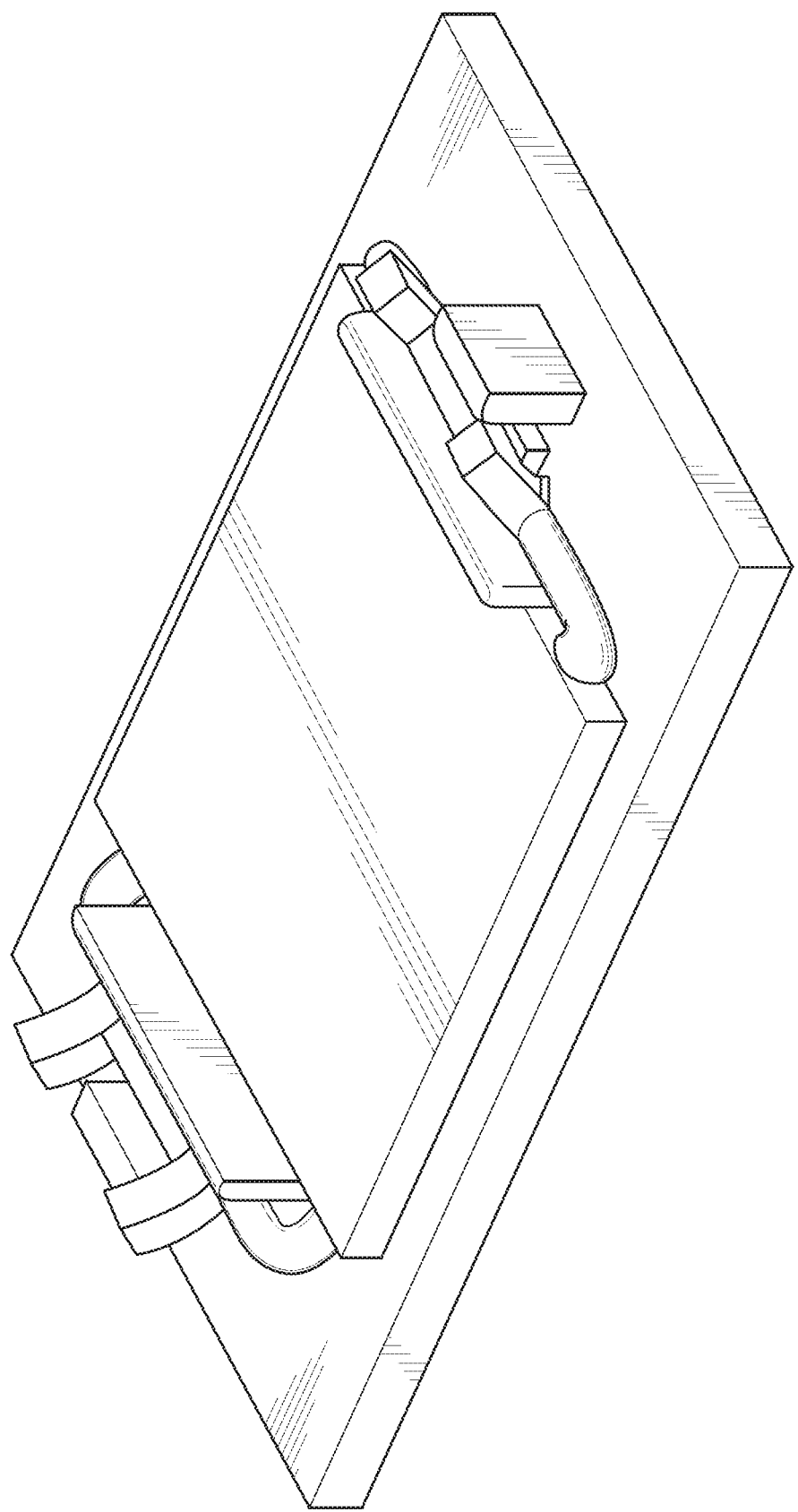
FIG. 16 is an illustration of another non-limiting variant of two piece closure assembly with in-molded crush barbs configured within upwardly extending securing walls associated with a base piece or layer, a second upper engaging layer having a pair of opposite end projecting pivot action end tabs which, upon aligning gaps in the second layer to receive the securing walls, permits the end tabs to be pivoted so that inner tips of the tabs form undercuts into crush barb protuberances formed in the opposing surfaces of the walls.

Finally, FIG. 16 presents a yet further illustration, generally at 234, of another non-limiting variant of two piece closure assembly, such including a base or anchoring layer 236 with an upper secured layer 238. The base layer 236 provides a typically more rigid or supporting layer including, at opposite ends, a pair of outer pedestals 240/242, with a pair of inwardly spaced end walls 242/246 opposing the outer pedestals 240/242 and defining a space therebetween for seating a pair of handle shaped articulating portions, further at 248/250, which loop around the walls 244/246 and between the outer pedestals 240/242.

A plurality of outer crush barb profiles, see at 252, 254, 256 for selected wall 244, are in-molded into the outer facing surface of each wall 244/246 associated with the base piece or layer. The handle shaped portions 248/250 of the second upper engaging layer each incorporate opposite end projecting pivot action end tabs, see individual pairs at 258/260 which, upon aligning gaps in the second layer to receive the securing walls, permits the end tabs to be pivoted (see arrow 262 for selected tabs 258).

The base layer 236 further exhibits a pair of ramp surface (of which is shown at 264 opposing the pivot tabs 258). Upon outward pivoting of the pairs of tabs, the ramps constrain the tabs in a fashion such that inner tips of the tabs (shown at 260) form undercuts into each of the crush barb protuberances 252, 254, 256, et seq. formed in the opposing surfaces of the walls. In this manner, the desired undercut formation of the crush barbs permit the layers to be secured together in the desired fashion.

Apart from the configuration shown, it is understood that additional designs or shapes associated with the inserting portion and opposing/receiving cavity can also be provided beyond that shown, in each instance providing any number or arrangement of crush barbs in combination with an inserting portion configuration (hinge over/center configured, tool actuated, or other) in order to form a retaining undercut profile into the in-molded barb and to thereby secure the pieces together.

Having described my invention, other and additional preferred embodiments will become apparent to those skilled in the art to which it pertains, and without deviating from the scope of the appended claims:

I claim:
1. A closure assembly, comprising:
a first piece having a recess cavity;
a crush barb molded into a defining surface of the recess cavity;
a second piece having an inserting portion which, upon locating relative to said first piece, positions said portion within the recess cavity; and
a tip of said portion contacting said crush barb such that, upon subsequently actuating said portion, said tip collapsing said crush barb at an undercut formed location in said barb to engage said pieces together.
2. The closure assembly of claim 1, further comprising an aperture in said second piece in proximity to said portion, a tool inserting through the aperture into contact with said portion and in order to actuate said tip to define said undercut within said crush barb.

3. The closure assembly of claim 1, said portion further comprising an over-center pivoting hinge actuated to create said undercut.

4. The closure assembly of claim 2, said portion further comprising a "J" hook shape extending from a location of said second piece proximate said aperture.

5. The closure assembly as described in claim 4, said tool further comprising an anvil shaped end profile which, upon seating within a curved bottom profile of said "J" hook and upon being downwardly depressed, causing said tip to collapse said crush barb.

6. A closure assembly, comprising:
a first material having an insert profile including a vertical extending flange and a hinged wing portion extending from said flange;
a second material having a receiving profile including a recess cavity with a bottom surface separating a first planar side surface for slidably receiving said flange and a second irregular side surface incorporating collapsible barbed portions; and
initial insertion of said insert profile causing said wing portion to abut a base location of said barbed portions, continued downward depressing motion of said insert profile causing said wing portion to achieve an over center rotation relative to a horizontal axis extending across said recess cavity and through a pivot location of said hinged portion for retaining said materials in engagement absent a sufficient upward retraction force to cause said wing portion to travel back over center.

7. The closure assembly as described in claim 6, further comprising an intermediate stepped location between said base of said barbed portions and said bottom surface.

8. The closure assembly as described in claim 6, said insert profile of said first material further comprising first and second spaced apart insert profiles, said receiving profile of said second material further comprising first and second spaced apart receiving profiles.

9. The closure assembly as described in claim 6, said first and second materials further comprising structural mating halves associated with a fluid passageway duct or conduit.

10. The closure assembly as described in claim 6, said first and second materials further comprising an extruded seal secured to a molded panel.

11. The closure assembly as described in claim 6, said first and second materials further comprising inter-engageable rivet-style portions.

12. A closure assembly comprising:
a first mounting material having an integrally formed and downwardly extending engagement profile;
said engagement profile further including a "J" hook shaped portion extending from an inner window perimeter defining edge of said first mounting material;
a second mounting material having an inner perimeter defining receiving cavity, into which is inserted said engagement profile; and
at least one crush location designed into an inside surface of said cavity defining perimeter which is opposed by a tip of said engagement profile, an anvil tool received through said window perimeter, an end profile of said tool seating within a curved bottom profile of said "J" hook portion and, upon being downwardly depressed, causing said engagement tip to collapse said crush locations and so that forcible displacement of said engagement profile causes localized collapse of said crush location to maintain thereafter said mounting materials into contact.

13. The closure assembly of claim 12, the second mounting material further comprising a tray having a recessed trough incorporating said crush locations, the first mounting material further including a coextrude flap including a harder base portion and a softer flap portion.

* * * * *